United States Patent [19]

Ostromoukhov

[11] Patent Number: 5,737,453
[45] Date of Patent: Apr. 7, 1998

[54] ENHANCED ERROR-DIFFUSION METHOD FOR COLOR OR BLACK-AND-WHITE REPRODUCTION

[75] Inventor: Victor Ostromoukhov, Lausanne, Switzerland

[73] Assignee: Canon Information Systems, Inc., Costa Mesa, Calif.

[21] Appl. No.: 651,042

[22] Filed: May 17, 1996

[51] Int. Cl.$^6$ .................................................. G06K 9/40
[52] U.S. Cl. ........................ 382/275; 382/252; 358/455; 358/456; 358/298; 358/534
[58] Field of Search ........................ 358/455, 447, 358/456, 457, 459, 298, 534, 536; 382/252, 251, 237, 275, 274, 172, 270, 465

[56] References Cited

U.S. PATENT DOCUMENTS

| | | | |
|---|---|---|---|
| 4,920,501 | 4/1990 | Sullivan et al. | 364/518 |
| 4,962,542 | 10/1990 | Klees | 382/54 |
| 5,014,333 | 5/1991 | Miller et al. | 382/54 |

(List continued on next page.)

FOREIGN PATENT DOCUMENTS

95/27365  10/1995  WIPO.

OTHER PUBLICATIONS

B.E. Bayer, "An Optimum Method For Two–Level Rendition of Continuous–Tone Pictures", IEEE 1973 International Conference On Communications, vol. 1, Jun. 1973, pp. 26.11–26.15.

R. Eschbach, "Reduction of artifacts in error diffusion by means of input–dependent weights", Journal of Electronic Imaging, Oct. 1993, vol. 2(4), pp. 352–358.

R.W. Floyd, et al., "An Adaptive Algorithm For Spatial Grey Scale", Proc. SID, 1976, vol. 17(2), pp. 75–77.

K.T. Knox, "Edge Enhancement In Error Diffusion", SPSE's 42nd Annual Conference, May 1989, pp. 310–313.

R. Eschbach, et al., "Error–diffusion algorithm with edge enhancement", J. Opt. Soc. Am. A, vol. 8, No. 12, Dec. 1991, pp. 1844–1850.

K. Knox, et al., "Analysis of Threshold Modulation in Error Diffusion", Proc. IS&T's Eighth International Congress on Advances in Non–Impact Printing Technologies, 1992, pp. 280–282.

(List continued on next page.)

*Primary Examiner*—Edward L. Coles, Sr.
*Assistant Examiner*—Madeleine Av Nguyen
*Attorney, Agent, or Firm*—Fitzpatrick, Cella, Harper & Scinto

[57] ABSTRACT

An enhanced error diffusion for color and/or black-and-white halftone reproduction of gray scale, color and/or black-and-white images, features enhancements in obtaining the thresholds that are used in error diffusion halftoning as well as enhancements in how to distribute error. Thresholds according to the invention are derived by applying a standard error-diffusion technique, using a fixed threshold value of 0.5, to a constant gray level image patch which has a gray level value corresponding to an irrational number. Thresholds so-derived are well dispersed in a threshold mask and have only a limited number of threshold values; use of such thresholds in error diffusion has been found to reduce significantly the presence of structural artifacts in halftone images. As for how to distribute error, the invention provides a different error distribution matrix for each gray level value (for example, 256 different error distribution matrices) and selects one such matrix for error distribution based on the gray level value of the target pixel in the original image. Particularly in a case where the error distribution matrix is in the form:

$$\frac{1}{3}\begin{vmatrix} 0 & 0 & 0 \\ 0 & 0 & 2 \\ 0 & 1 & 0 \end{vmatrix}$$

for highlight/shadow regions, distributing error according to the invention has been found to reduce significantly the presence of worm-like chains in such highlight and shadow regions.

26 Claims, 17 Drawing Sheets

U.S. PATENT DOCUMENTS

| | | | |
|---|---|---|---|
| 5,045,952 | 9/1991 | Eschbach | 358/447 |
| 5,050,000 | 9/1991 | Ng | 358/298 |
| 5,060,284 | 10/1991 | Klees | 382/53 |
| 5,107,346 | 4/1992 | Bowers et al. | 358/447 |
| 5,111,310 | 5/1992 | Parker et al. | 358/456 |
| 5,130,823 | 7/1992 | Bowers | 358/465 |
| 5,150,429 | 9/1992 | Miller et al. | 382/50 |
| 5,153,925 | 10/1992 | Tanioka | 382/252 |
| 5,184,213 | 2/1993 | Ishida | 358/75 |
| 5,204,760 | 4/1993 | Murayama et al. | 358/456 |
| 5,208,871 | 5/1993 | Eschbach | 382/41 |
| 5,226,094 | 7/1993 | Eschbach | 382/41 |
| 5,226,096 | 7/1993 | Fan | 382/50 |
| 5,243,443 | 9/1993 | Eschbach | 358/455 |
| 5,245,678 | 9/1993 | Eschbach et al. | 382/50 |
| 5,259,042 | 11/1993 | Matsuki et al. | 382/252 |
| 5,268,774 | 12/1993 | Eschbach | 358/466 |
| 5,276,535 | 1/1994 | Levien | 358/456 |
| 5,278,670 | 1/1994 | Eschbach | 358/453 |
| 5,289,294 | 2/1994 | Fujisawa | 358/461 |
| 5,309,254 | 5/1994 | Kuwabara | 358/456 |
| 5,313,287 | 5/1994 | Barton | 358/458 |
| 5,317,653 | 5/1994 | Eschbach et al. | 382/50 |
| 5,321,525 | 6/1994 | Hains | 358/456 |
| 5,325,211 | 6/1994 | Eschbach | 358/466 |
| 5,325,448 | 6/1994 | Katayama et al. | 382/50 |
| 5,331,429 | 7/1994 | Levien | 358/456 |
| 5,337,160 | 8/1994 | Jones | 358/447 |
| 5,339,171 | 8/1994 | Fujisawa et al. | 358/458 |
| 5,341,224 | 8/1994 | Eschbach | 358/456 |
| 5,341,228 | 8/1994 | Parker et al. | 358/534 |
| 5,363,213 | 11/1994 | Coward et al. | 358/455 |
| 5,383,033 | 1/1995 | Takahashi | 358/456 |
| 5,387,987 | 2/1995 | Ino | 358/456 |
| 5,418,626 | 5/1995 | Semasa | 358/451 |
| 5,422,742 | 6/1995 | Ostromoukhov | 358/536 |
| 5,438,431 | 8/1995 | Ostromoukhov | 358/457 |
| 5,442,461 | 8/1995 | Levien | 358/456 |
| 5,467,201 | 11/1995 | Fan | 358/447 |
| 5,469,276 | 11/1995 | Shu | 358/534 |
| 5,488,673 | 1/1996 | Katayama et al. | 382/270 |
| 5,489,991 | 2/1996 | McMurray | 358/456 |
| 5,535,019 | 7/1996 | Eschbach | 358/456 |
| 5,553,166 | 9/1996 | Kakutani | 382/252 |
| 5,557,709 | 9/1996 | Shu | 395/109 |
| 5,565,994 | 10/1996 | Eschbach | 358/298 |
| 5,579,446 | 11/1996 | Naik et al. | 395/109 |
| 5,621,546 | 4/1997 | Klassen et al. | 358/536 |
| 5,625,755 | 4/1997 | Shu | 395/109 |
| 5,648,801 | 7/1997 | Beardsley et al. | 347/15 |

OTHER PUBLICATIONS

K.T. Knox, "Error Diffusion: A Theoretical View", SPIE 1993, vol. 1913, pp. 326–331.

C. Rosenberg, "Measurement–based evaluation of a printer dot model for halftone algorithm tone correction", Journal of Electronic Imaging, Jul. 1993, vol. 2(3), pp. 205–212.

Z. Fan, "Error diffusion with a more symmetric error distribution", SPIE vol. 2179, Mar. 1994, pp. 150–158.

P. Emmel, et al., "A Grid–Based Method For Predicting The Behaviour of Colour Printers", Proceedings of the Third IS&T/SID Color Imaging Conference 1995, pp. 71–77.

V. Ostromoukhov, et al., "Artistic Screening", Computer Graphics Proceedings, Siggraph '95, pp. 219–228.

I. Amidror, et al., "Spectral Analysis and Minimization of Moire Patterns In Color Separation", Journal of Electronic Imaging, vol. 3, No. 3, Jul. 1994, pp. 295–317.

V. Ostromoukhov, et al., "Two Approaches in Scanner–Printer Calibration: Colorimetric Space–Based Vs. 'Closed–Loop'", Proceedings of the SPIE, The International Society of Optical Engineering, vol. 2170, 1994, pp. 133–142.

V. Ostromoukhov, et al., "Rotated Dispersed Dither: A New Technique for Digital Halftoning", Proceedings of the 21st International Siggraph Conference, Jul. 1994. pp. 123–130.

V. Ostromoukhov, "Hermite Approximation For Offset Curve Computation", IFIP Transactions B (Applications in Technology), vol. B–9, 1993, pp. 189–196.

V. Ostromoukhov, "Reproduction Couleur Par Trames Irregulieres Et Semi–Regulieres, 1995.

R. Ulichney, *Digital Halftoning*, MIT Press, 1987, Chapter 8, pp. 233–331.

P. Fink, *PostScript Screening: Adobe Accurate Screens*, Adobe Press 1992, Chapter 2, pp. 15–26.

Graham, *Concrete Mathematics: A Foundation For Computer Science*, 2nd Edition, Addison Wessley, 1994, pp. 102–105, 123–139.

COLOR MANAGEMENT SYSTEM 0 (BLACK)  1 (WHITE)

0 (BLACK)   1/2   1 (WHITE)

ENHANCED ERROR-DIFFUSION METHOD FOR COLOR OR BLACK-AND-WHITE REPRODUCTION

BACKGROUND OF THE INVENTION

1. Field of the Invention

The present invention relates to reproduction of digital image data for printing and visualization purposes, and in particular to a method for generating digital halftone images using an enhanced error distribution technique. The enhanced error distribution technique features (a) error-distribution coefficients that are input-signal dependent, and (b) thresholds that are stored in a threshold mask which is well-dispersed and has a limited number of levels. The inventive technique is particularly effective for binary physical output devices, such as ink-jet printers or the like.

2. Description of the Related Art

Digital computers commonly store images in bitmap format such that each pixel of the image has gray level, such as a gray level that ranges between 0 and 255 (i.e., an 8-bit system). Each gray level represents an increment of gray between a pure black value and a pure white value. In the case of color images, three color separations each include gray level values for each pixel of the image, and if eight bits are used for each color separation, results in the possibility of representing 16,777,216 different colors (commonly called "24-bit color").

Examples of how such images may be formed include the possibility of scanning an ordinary continuous tone photograph into a digital computer, so as to form bitmap image data at a particular pixel resolution, such as 300 or 600 dots per inch. The bitmap image data might thereafter be compressed using any of a variety of standard image compression techniques (such as "JPEG" or "GIF"), but before use even compressed images are uncompressed to bitmap image format.

Bitmap images containing gray level pixels are unprintable by today's printers, because such printers can only print one (or, at most, a limited small number of) density value at each pixel. For example, at each pixel, a conventional laser beam printer or ink-jet printer is able to do only one of two things: (1) apply colorant (such a black or colored toner or ink) resulting in a completely filled in or black pixel, or (2) refrain from applying colorant resulting in a completely white pixel. Since each pixel of the original image data has up to 256 different gray levels, it can be seen that a tremendous amount of information is lost during the printing process where, for each pixel, only a black or white value can be printed.

Recently, printers have become available which print a variable size dot at each pixel, but the amount of variation in the dot is only a few different levels, such as four. Accordingly, it can be seen that even with the most modern printers available, a tremendous amount of information is lost when printing a gray-level image or a color image with each color separation plane represented by gray levels.

A wide variety of halftoning processes have been proposed so as to minimize the information lost when printing, and so as to produce visually acceptable printed images of gray level images. "Halftoning" is a process by which gray-level pixels in a bitmap image are converted to binary pixels for printout by a conventional printer. (Of course, in a situation where a printer can print multiple levels for each pixel, "halftoning" refers to the process by which gray level pixels are converted to corresponding N-ary values for printout by such a multi-level printer.) Good halftoning processes should satisfy the following criteria:

(1) The local mean intensity of the reproduction should follow the intensity level of corresponding areas of the original image;

(2) Small details should not be lost in reproduction;

(3) No visible artifacts should be created, such as low-frequency beatings, bandings, worm-like structure, Moiré effects, etc.;

(4) To the extent that structural artifacts are unavoidable in the halftoning process, such structural artifacts should be filtered as much as possible by the human visual system;

(5) Textures present in the original should be of the same nature as textures in the reproduction, meaning that such textures should have the same shape and same visual appearance;

(6) The reproduction should have an overall visually pleasing appearance.

In low-resolution bi-level printing devices, such as ink-jet printers and laser beam printers operating in the range between 300 and 800 dpi, individual dots are still visible, and groups of individual dots are therefore necessarily visible as well. Accordingly, a good halftoning process needs to deal with visible dots and groups of individual dots.

A large variety of halftoning processes for printing are known in the art. The most popular halftoning processes are ordered dithering methods and error-distribution (or error-diffusion) methods. Ordered dithering methods use spatial dithering in order to obtain clustered-dot or dispersed-dot repetitive binary patterns on output devices. Error distribution (or error-diffusion) methods produce dispersed non-repetitive patterns whose mean density is more-or-less proportional to the intensity of the input signal.

For high-resolution devices, i.e., those devices operating above around 800 dpi, ordered dithering methods are usually preferable. Images produced using ordered dithering methods are generally visually pleasing, and produce an illusion of spatial continuity even when images are rendered on a binary device. Both theoretical and practical research has confirmed that the human visual system filters out medium sized diagonally-oriented structures. Thus, "classical" clustered-dot dithering techniques are extremely popular.

One weak point of most ordered dithering methods, however, is their inherent property of low-pass filtering. Low-pass filtering causes small details whose size is smaller than the size of a cluster dot to be rendered poorly, and sometimes even lost. A second weak point is the so-called "banding effect". The banding effect is caused since classical methods can reproduce only a fixed number of intensity levels, set by the surface area of the cluster. The banding effect leads to displeasing bandings that are visually apparent in the image, giving a false contouring effect.

For these reasons, when ordered dithering methods are applied to low resolution binary printing devices (that is, those operating in the range between 300 and 800 dpi), poor image printing is often the result. (The popularity of ordered dithering methods in low resolution devices can be explained by the relative ease with which such methods are implemented in software.)

Error distribution methods work by comparing the gray level of a target pixel with a threshold value, printing a black (or colored) or a white pixel based on the comparison, determining the error between the black or white pixel actually printed and the actual gray value of the target pixel, and distributing the error to pixels adjacent the target pixel.

Error-distribution methods solve at least the problem of small-detail rendering when low-resolution printing devices are used. Due to their inherent edge enhancement property, which is well-documented in the art, the error distribution methods of this class are sometimes preferable for use in output devices operating at low resolution. Error-distribution methods also have weaknesses. Weaknesses to which the present invention is addressed are described as follows.

First, images produced with error distribution methods often contain aperiodic visible structures which form worm-like chains of varying length. Such worm-like chains, which are well documented in the art, are most readily apparent in highlight or shadow regions, and examples are illustrated in FIG. 1. In FIG. 1, 10 represents a printout of standard error distribution halftoning of an 8×4 grid of patches, with each patch having a constant gray level. The 8×4 grid of FIG. 1 includes patches only in light light gray areas, and does not include patches of darkness exceeding around 10% gray. Worm-like chains are clearly shown at 11 and 12. Particularly in cases of low-resolution printers, where the individual printing dots are clearly visible, viewers who expect to see completely disordered patches of gray are displeased when viewing patches containing worm-like chains such as those shown at 11 and 12.

A second drawback inherent to most error distribution methods is the problem of unstable formation of patches having highly repetitive structures. Such structures are illustrated in FIG. 2, which shows a gray level wedge proceeding from full black (at an image intensity level of 0) to full white (at an image intensity level of 1). Repetitive structures are clearly visible throughout the gray wedge, particularly at 14, 15, 16 and 17. Not only is the presence of highly repetitive structures visually displeasing, but it also plays an important role in the non-linear behavior of printing processes which use error distribution methods.

Noticeable efforts have been made in the past, in order to diminish the inherent problems of existing error distribution methods and to increase the quality of the images produced by such methods. In particular, efforts which address the problem of worm-like chains in highlight and shadow areas, and which address the problem of repetitive structures, include the following.

U.S. Pat. No. 5,014,333 to Miller and Morton discloses an error-propagation halftoning method where a periodic spatial distribution of the threshold values is used, instead of constant threshold values in a "standard" error-distribution method and where in very light and very dark areas the propagated errors are attenuated. The main advantage of this method is said to be in effecting smooth transition between dither and diffusion processes.

U.S. Pat. No. 5,341,228 to Parker and Mitsa discloses a halftoning method where a big threshold matrix is used. This threshold matrix is prepared in such a way that the resulting bi-level image exhibits the characteristics of so-called blue-noise, which is said to be pleasant for visual perception. This patent also proposes an alternative method for producing dispersed-dot dither matrices.

U.S. Pat. No. 4,962,542 to Klees discloses a halftoning method where a recursive spatial filter interchanges the value of a control pixel with that of the value of a predetermined surrounding pixel in a mark when a specific image pattern occurs in the digital image. The main goal of this method appears to be elimination of visible grain patterns from the bi-level output image.

U.S. Pat. No. 5,150,429 to Miller and Smith discloses a halftoning method where an image processor performs error diffusion by thresholding an incoming gray pixel to black or white, by comparing the difference between the black or white print value and the incoming pixel gray level, and superimposing the difference on the next pixel gray level. The threshold value is read out from a threshold matrix which has been modulated with a pattern which is complementary to the known artifact pattern of the error diffusion process. The main goal of this method appears to be elimination of visible artifacts from the bi-level output image.

U.S. Pat. No. 5,243,443 to Eschbach discloses a halftoning method where a combination of halftoning and error diffusion initially determines a best fit halftone cell, according to the terms of the inventor, and propagates the halftoning error in order to maintain gray density. The main goal of this method appears to be a reduction of visible error-diffusion artifacts in the output image.

U.S. Pat. No. 5,313,287 to Barton discloses an error-diffusion halftoning method where the direction of processing scan lines of a source image is selected with blue noise, in order to reduce directional and start-up anomalies. Error diffusion threshold values are modulated with blue noise. Error terms in the error diffusion process are distributed according to a special three-weight filter. It appears that the goal of this method is to reduce visible error-diffusion artifacts in the output image.

U.S. Pat. No. 4,920,501 to Sullivan and Miller discloses a method of producing a binary bit image pattern having a minimal visual noise for each density level in an image. The patterns are produced by employing a stochastic combinatorial minimization technique and a human visual system modulation transfer function.

R. Eschbach in "Reduction Of Artifacts In Error Diffusion By Means Of Input-Dependent Weights" proposes two different error distribution matrices, one for highlights and one for mid-tones. The problem of visibility of the transition between these two areas is mentioned, and a solution based on randomizing the location of the transition boundary is proposed. The author claims that in highlights the worm-like structures are greatly reduced by mean of a modified error-diffusion matrix.

Although the above illustrates the efforts undertaken to address the problem of worm-like chains in highlight areas, and the problem of repetitive structural artifacts, there exists the need for further improvement.

SUMMARY OF THE INVENTION

The present invention improves currently existing error diffusion techniques by addressing the problems of worm-like chains in highlights and shadows, and at the same time addressing the problem of structural artifacts. Specifically, error diffusion according to the invention suppresses considerably worm-like structural chains in highlight and shadow areas, and diminishes considerably structural artifacts in standard error diffusion techniques, thereby improving tone reproduction curves.

Exemplary outputs of improved error diffusion according to the invention are presented in FIGS. 3 and 4, which respectively correspond to outputs of prior art techniques in FIGS. 1 and 2. Thus, considering FIG. 3 with respect to the prior art output of FIG. 1, it can be seen that the existence of worm-like chains in highlight areas (and correspondingly in shadow areas) is suppressed considerably when using error improved error diffusion according to the invention. Likewise, in considering FIG. 4 in conjunction with FIG. 2, it can be seen that structural artifacts are diminished considerably yielding an improved gray scale wedge from pure black to pure white.

According to a fiirst aspect of the invention which addresses primarily the existence of structural artifacts in a gray scale wedge, error diffusion is carried out with thresholds which differ rather than being fixed. While prior art efforts have examined the possibility of using thresholds that differ, those prior art techniques are believed to differ from that of the present invention in the following respects. Specifically, thresholds according to the invention are stored in a well-dispersed threshold mask having a limited small number of values, such as two or three or four values, with those values being obtained in accordance with the following technique. First, a constant gray level image is created, with the gray level image having a gray level that corresponds to an irrational number such as 1/e (e being the base of natural logarithms), 1/π (with π being the ratio of the circumference of a circle to its diameter), or 1/φ (φ being the golden ratio). A standard error-diffusion technique is applied to the constant gray level image using a fixed threshold value of 0.5. The resulting bitmap mask is a two-valued threshold mask that is suitable for use in the present invention. If a three-valued or n-valued mask is desired, repeated applications of an error diffusion technique are applied to constant gray level images (which may have the same gray level as used the first time or a different gray level), but using the just-derived threshold mask rather than a fixed threshold value of 0.5. The resulting output is averaged with previously-derived threshold masks, yielding increasingly-valued masks. If desired, values in the threshold masks can be scaled so as to change the degree to which structural artifacts are suppressed.

Thus, according to this aspect of the invention, error diffusion halftoning uses a non-constant threshold value, with threshold values being stored in a well-dispersed threshold mask having only a limited small number of values, such as two or three or four values. Preferably, the threshold values are derived by applying standard error techniques starting with a fixed threshold value, to a constant gray level image having a gray level value corresponding to an irrational number.

A second aspect of the invention, which addresses primarily the suppression of worm-like chains in highlights and shadows, concerns techniques for distributing error during error diffusion halftoning. More specifically, as described above, halftoning using error-diffusion works by distributing error (between the black or white pixel actually printed in the actual gray value of a target pixel) to pixels adjacent the target pixel. Conventional error-diffusion halftoning distributes error using a 3×3 error distribution matrix whose coefficients are fixed regardless of the gray-level intensity of the target pixel. For example, Floyd-Steinberg in 1976 proposed a 3×3 error distribution matrix that is still in widespread use today and whose coefficients are:

$$\frac{1}{16} \begin{vmatrix} 0 & 0 & 0 \\ 0 & 0 & 7 \\ 3 & 5 & 1 \end{vmatrix}$$

According to this aspect of the invention, the error distribution matrix has coefficients which are selected in accordance with the gray-level intensity of the target pixel. Preferably, two different error-distribution matrices are defined, with a first matrix being selected for highlight or shadowed target pixels, and with a second matrix being selected for mid-tone target pixels. In the highlight-to-mid-tone transition, and in the mid-tone-to-shadow transition, plural matrices are defined, which blend gradually from values in the first matrix toward values in the second matrix, and then blend gradually from values in the second matrix towards values in the first matrix. For target pixels whose gray level is in the highlight-to-mid-tone region (or the mid-tone-to-shadow region), one of these plural matrices is selected in accordance with the gray level.

In connection with this aspect, the invention defines a technique for determining each of the plural matrices. Consider, for example, that the gray scale can be divided into five segments: a shadow region, a shadow-to-mid-tone region, a mid-tone region, a mid-tone-to-highlight region, and a highlight region. A first error-distribution matrix is used in the shadow and in the highlight region. A second error-distribution matrix is used in the mid-tone region. In the two transition regions, error distribution coefficients are calculated based on the first and the second matrices and based on the actual gray level of the target pixel so as to obtain a blended transition between error distribution coefficients in the first matrix and those in the second matrix.

Preferably, the error distribution coefficients for highlights and shadows comprise a matrix of the form:

$$\frac{1}{3} \begin{vmatrix} 0 & 0 & 0 \\ 0 & 0 & 2 \\ 0 & 1 & 0 \end{vmatrix}$$

It has been discovered that in cooperation with the variable threshold mask that forms part of the first aspect of the invention, such an error distribution matrix eliminates almost completely the worm-like chains that characterize prior art error distribution in highlight and shadow regions.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 5:
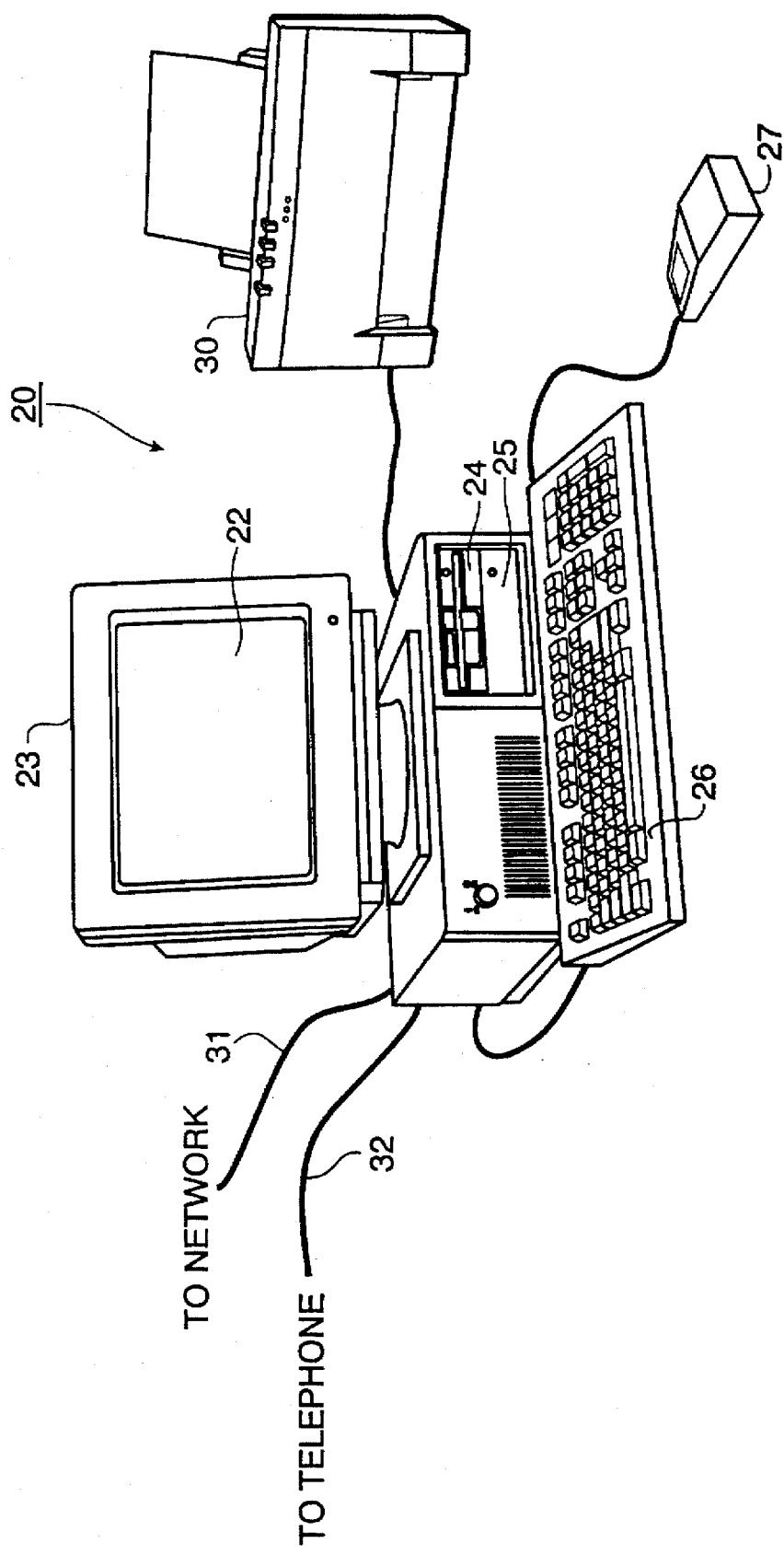
FIG. 5 is a view showing the outward appearance of representative computing equipment which incorporates enhanced error diffusion according to the invention.

FIG. 5 is a view showing the outward appearance of representative computing equipment which incorporates enhanced error diffusion according to the invention. Shown in FIG. 5 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22. A conventional color printer 30, such as a color bubble jet printer, is also provided. Also provided are connections to a network 31 or to an ordinary voice telephone line 32, both for sending and receiving color image data as well as other files such as files which include program instruction sequences by which computing equipment 20 is operated.

While a bubble jet printer is presently preferred, any color printer which forms full color images by mixing colorants in amounts set by corresponding color component values, such as a color laser beam printer or color thermal wax printer or the like, is suitable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 6:
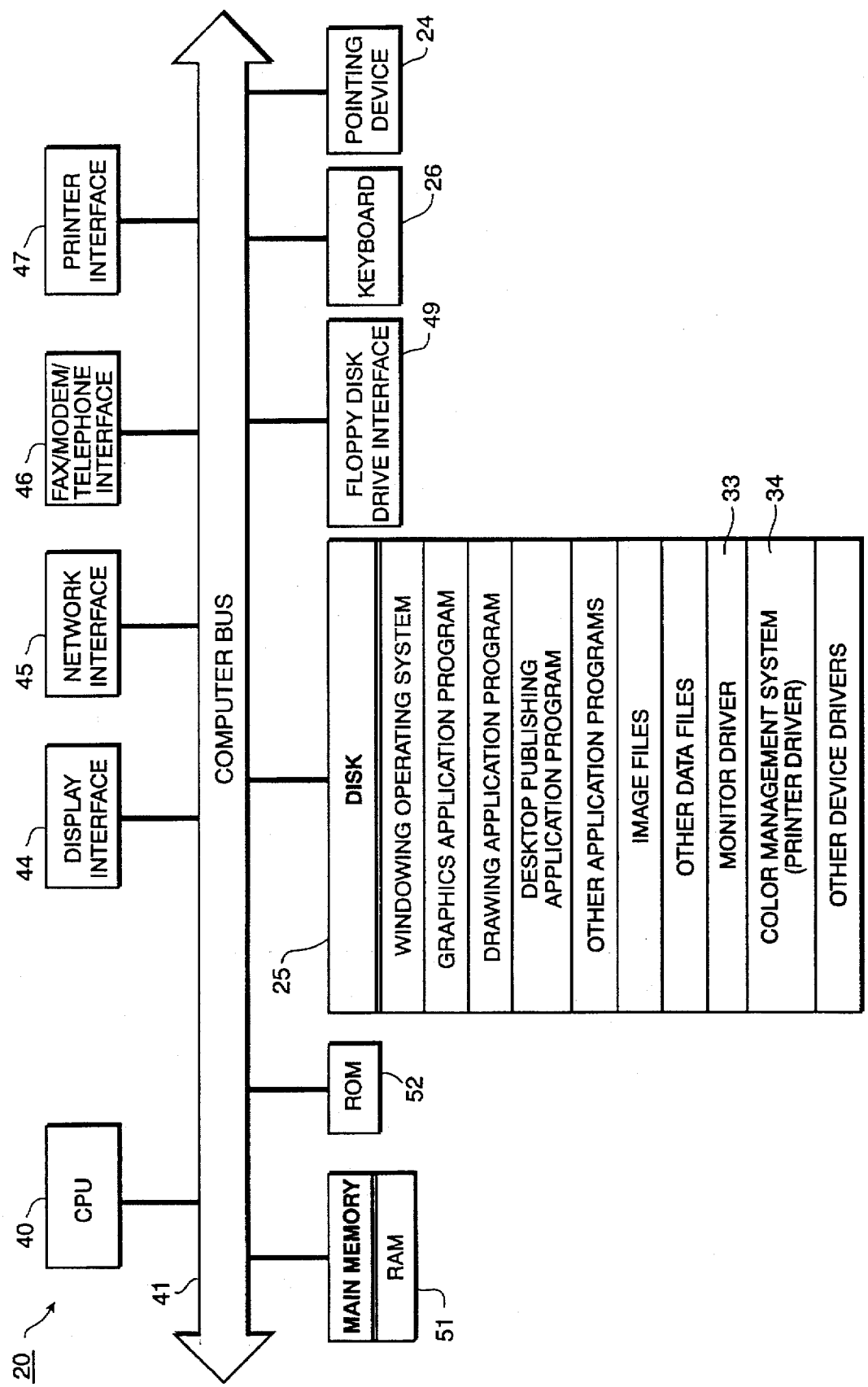
FIG. 6 is a detailed block diagram showing the internal construction of FIG. 5.

FIG. 6 is a detailed block diagram showing the internal construction of computing equipment 20. As shown in FIG. 6, computing equipment 20 includes a central processing unit (CPU) 40 such as programmable microprocessor interfaced to a computer bus 41. Also interfaced to computer bus 41 is display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 6, and as previously mentioned, fixed disk 25 stores program instruction sequences for the windowing operating system and for various application programs such as a graphics application program, a drawing application program, a desktop publishing application program, and the like. In addition, stored on fixed disk 25 are color image files such as are displayed on monitor 23 or printed on printer 30 under control of a designated application program. Fixed disk 25 also stores a monitor driver 33 which controls how RGB color primary values are provided to display interface 44, and color management system 34 which is a printer driver for controlling how CMYK color component values are provided to printer interface 47 for printout by printer 30. Enhanced error diffusion according to the invention, in this embodiment of the invention, resides in color management system 34. Other device drivers are also stored on fixed disk 25, for providing appropriate signals to the various devices (such as the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of color management system 34 is stored. The user would then install color management system 34 onto disk 25 by inserting the purchased floppy disk into floppy disk drive 24 and by commanding CPU 40 to copy color management system 34 from the floppy disk onto disk 25. It is also possible for the user, via telephone 32 and modem interface 46, or via network 31 and network interface 45, to download color management system 34 from a computerized bulletin board to which the drivers had previously been uploaded.

Figure 7:
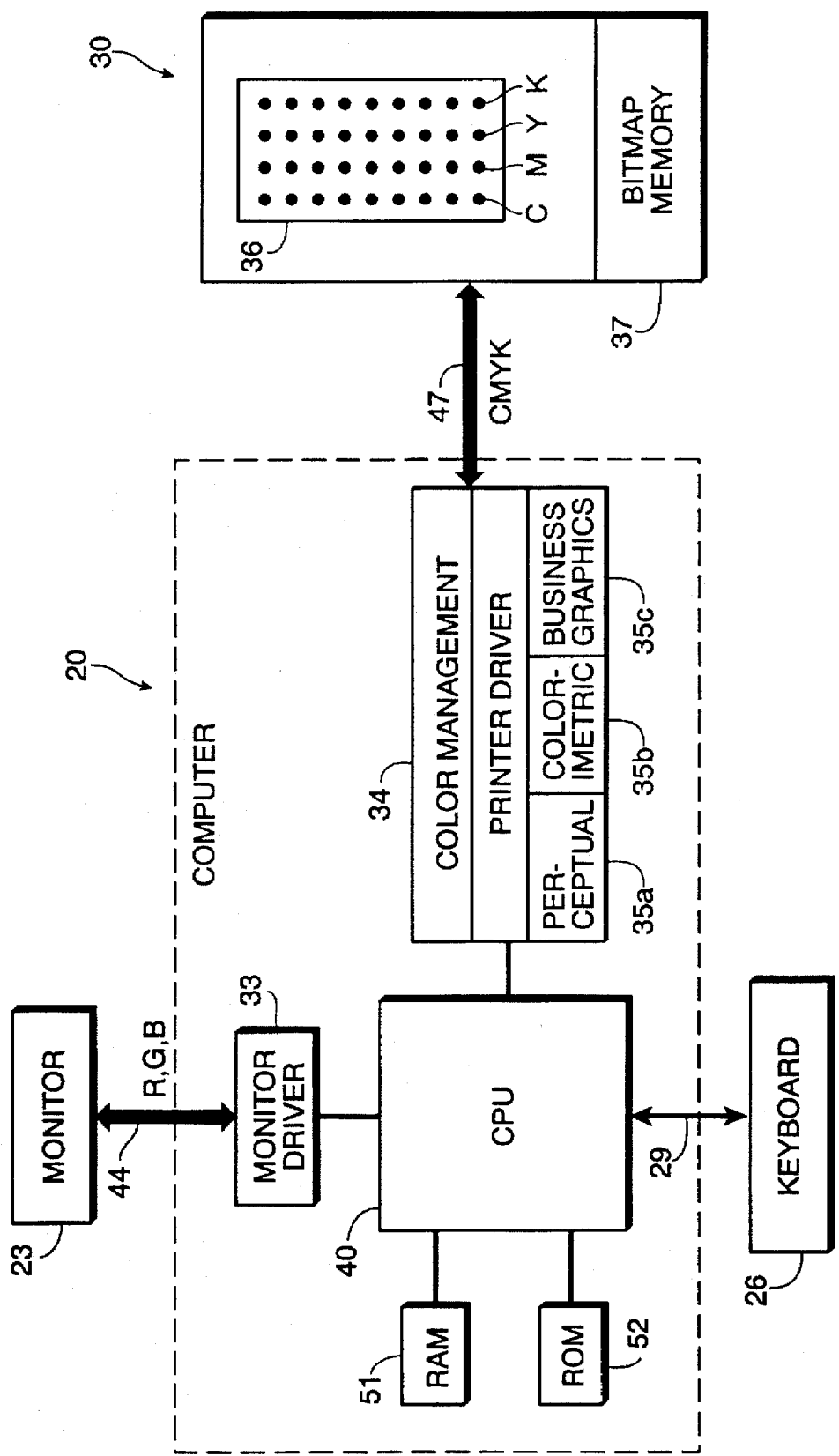
FIG. 7 is a functional block diagram which stresses functional connectivity of some of the elements of the FIG. 6 block diagram.

FIG. 7 is a functional block diagram showing how computer 20 interacts with monitor 23 and printer 30. Shown in FIG. 7 are computer 20 with monitor driver 33, color management system 34, CPU 40, RAM 51 and ROM 52, all arranged functionally rather than structurally, as in FIG. 6.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image for display on monitor 23. CPU provides the color image to monitor driver 33 which in turn derives gray-level RGB values for each pixel in the monitor 23. The RGB values are provided via display interface 44 to monitor 23 where those values are displayed. Since monitor 23 is a continuous tone analog device, the color image displayed on monitor 23 from the derived RGB values is a continuous tone image based on the gray-levels of each of the R,G and B values.

Upon request, CPU 40 also feeds a color image to color management system 34 for printing by color printer 30. Color management system 34 derives binary CMYK values for each pixel of the color image based on the gray-level RGB color values provided from CPU 40. The color management system 34 allows selection, ordinarily by the user but in some cases automatically by CPU 40, of one of plural rendering modes, here, a perceptual rendering mode, a colorimetric rendering mode, and a business graphics rendering mode. Enhanced error diffusion according to the invention, in this embodiment of the invention, operates during the perceptual rendering mode, but it is possible to incorporate gray component replacement according to the invention in any or all of the rendering modes. Whichever one of the plural modes is selected, however, the ultimate purpose of color management system 34 is to halftone-process the gray-level RGB values provided from CPU 40 so as to obtain binary CMYK values, and to provide the binary CMYK values to printer 30 for printing.

More particularly, for each pixel of an image on monitor 23, color management system 34 converts the gray-level RGB value of the pixel into a binary halftone value for each of the CMYK color components printed by printer 30. For example, if each pixel of the image on monitor 23 is represented by a 24-bit RGB value (i.e., eight bits for R, eight bits for G, and eight bits for B), color management system 34 obtains a digital halftone value in which each of the CMYK color components is represented by a single bit indicating whether a dot of the respective color component is to be printed at a corresponding pixel position by printer 30.

Thereafter, color management system 34 feeds the CMYK values via printer interface 46 to printer 30 where they are stored in bitmap memory 37 within printer 30. Bitmap memory 37 may store a full bitmap image of the printed image, or it may store only a band or partial bitmap image. When sufficient color data, namely binary halftoned CMYK data, is stored in bitmap memory 37, a color print head 36 reciprocates across a platen adjacent a sheet of paper. In a preferred embodiment, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 8:
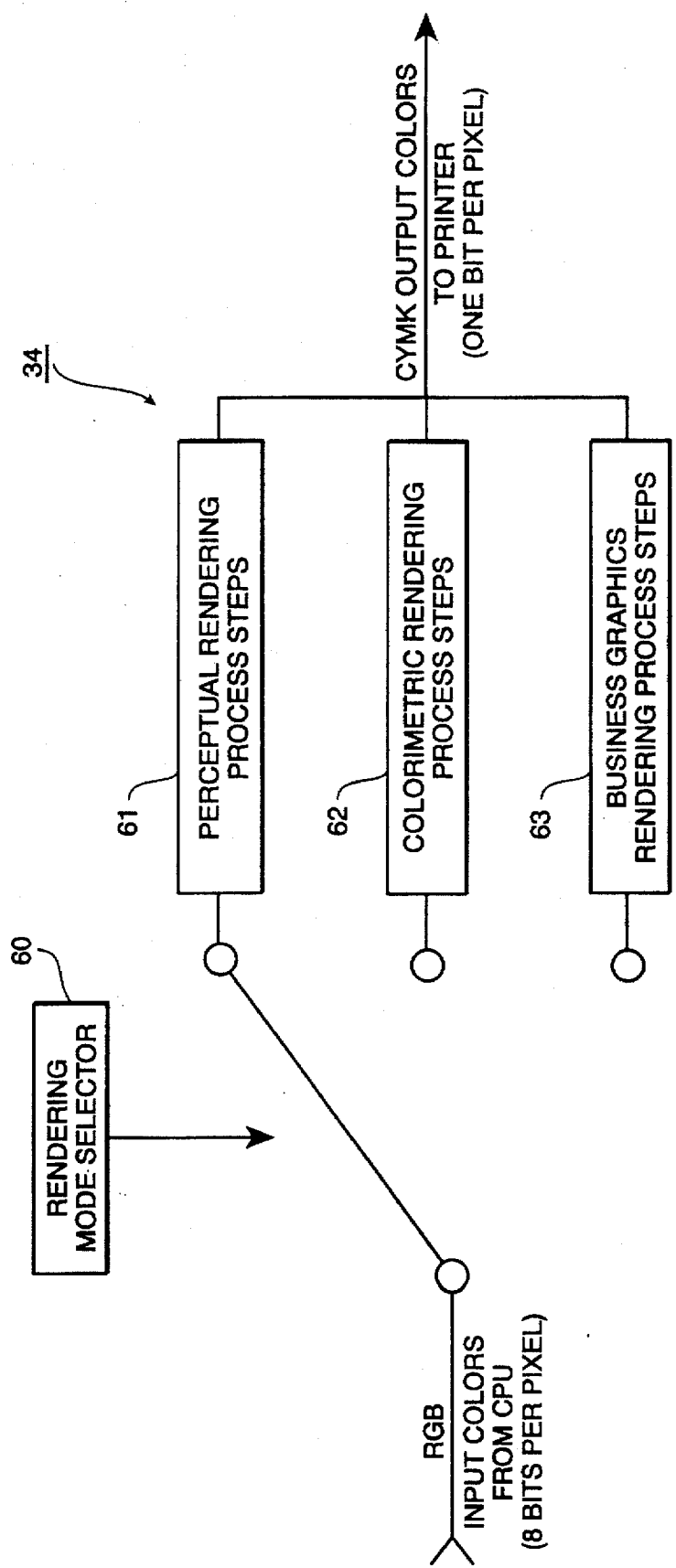
FIG. 8 is a functional view of a color management system including enhanced error diffusion according to the invention.

FIG. 8 is a view showing the functional arrangement of color management system 34. The color management system shown in FIG. 5 includes plural different rendering modes, in which at least one rendering mode such as the perceptual rendering mode incorporates enhanced error diffusion according to the invention. As shown in FIG. 8, color management system 34 includes a rendering mode selector 60 which allows selection between one of the plural rendering modes of the color management system. Preferably, rendering mode selector 60 is a user manipulable graphical user interface which allows a user, after commanding an image to be printed, to select one of the plural rendering modes by which color management system 34 is able to render the image. Alternatively, it is also possible for rendering mode selector 60 to be actuatable automatically under control of CPU 40, in which case CPU 40 would make automatic selection of the proper rendering mode. Such automatic selection may, for example, be made based on the type of application software which is generating the image, based on data or image type, based on data structure, based on a histogram or other analysis of color distribution in the image, or the like. For example, all BMP type data might have perceptual rendering automatically selected, while vector graphics might have business graphics rendering automatically selected, and so on.

Based on the mode selected by rendering mode selector 60, gray-level values for each of the RGB input colors from CPU 40 are fed for appropriate processing to the selected one of the plural rendering modes, so as to generate printer binary CMYK colorant values.

Figure 9:
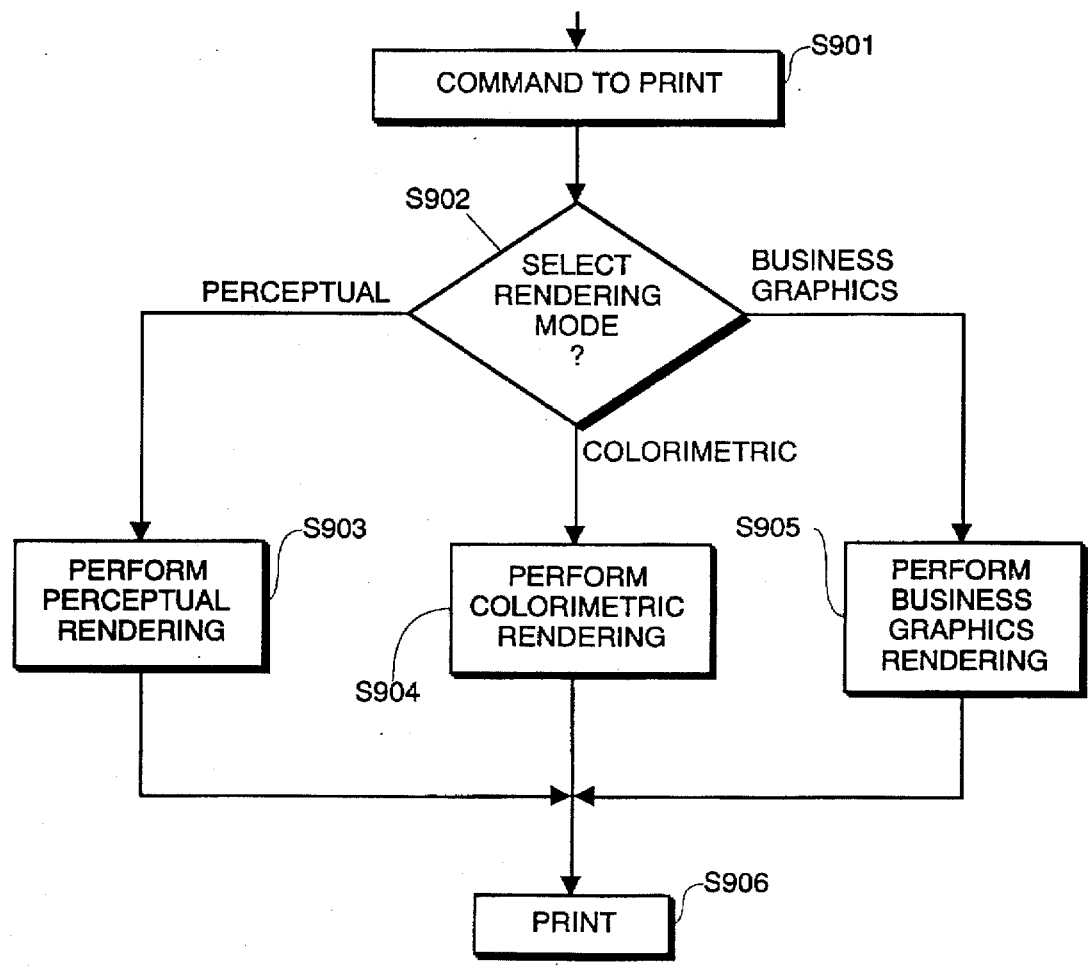
FIG. 9 is a flow diagram showing operation of the color management of FIG. 8.

FIG. 9 is a flow diagram used for explaining operation of color management system 34 shown in FIG. 8.

In step S901, a user issues a command to print. Flow then advances to step S902 in which a rendering mode is selected. Specifically, as mentioned above in connection with FIG. 8, step S902 utilizes rendering mode selector 60 so as to select one of the plural different rendering modes included in color management system 34. Selection can be manual by the user or automatic by computer, although automatic selection with manual override is preferred.

If a perceptual rendering mode is selected in step S902, then flow advances to step S903 in which perceptual rendering is performed in accordance with perceptual rendering process steps 61. Perceptual rendering in accordance with step S903, which includes enhanced error diffusion according to the invention, is described in further detail in connection with FIGS. 10 through 17(b). Thereafter, binary CMYK values derived in perceptual rendering step S903 are provided to printer 30 for printing (step S906).

If in step S902 colorimetric rendering is selected, then flow advances to step S904 in which colorimetric rendering is performed in accordance with colorimetric rendering process steps 62. Any suitable colorimetric rendering process steps may be used, as will be apparent to those skilled in the art. Thereafter, CMYK values derived in colorimetric rendering step S904 are provided to printer 30 for printing (step S906).

If in step S902 business graphics rendering is selected, then flow advances to step S905 in which business graphics rendering is performed in accordance with business graphics rendering process steps 63. Any suitable business graphics rendering may be used, as will be apparent to those skilled in the art. Thereafter, CMYK values derived in business graphics rendering step S905 are provided to printer 30 for printing (step S906).

Figure 10:
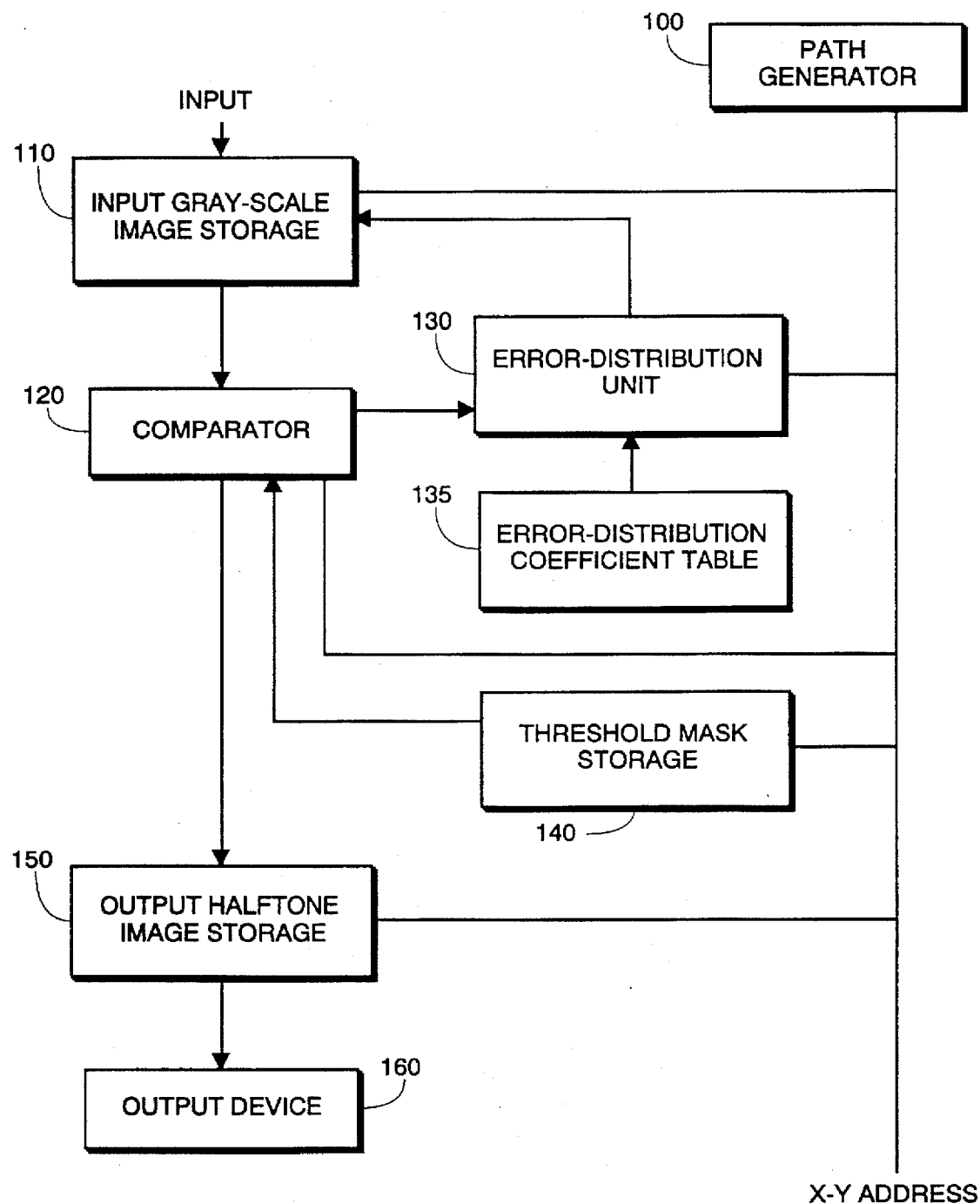
FIG. 10 is a block diagram showing an apparatus for performing enhanced error diffusion according to the invention.

FIG. 10 is a simplified block diagram of an apparatus for carrying out enhanced error diffusion according to the invention. The apparatus shown in FIG. 10 might be implemented as a physical apparatus, but more preferably the apparatus of FIG. 10 is implemented as software steps in connection with perceptual rendering process steps 61 (step S903).

As shown in FIG. 10, enhanced error distribution according to the invention includes an input gray scale image storage section 110 for storing gray-level values for each of the RGB color components of an output image. Comparator 120 operates on each pixel of the gray level values stored in gray level image storage second 110, and for each pixel compares the gray level value with a threshold obtained from threshold mask storage section 140. Based on the comparison, comparator 120 outputs a binary 1 for the pixel if a white output is desired, or a binary 0 for the pixel if a colored (or black) output is desired. The output is stored in halftone image storage section 150. Error between the binary output stored in halftone image storage section 150 and the gray level value in the gray-level image storage section 110 is output to error distribution unit 130. Error distribution unit 130 calculates how the error is to be distributed to adjacent pixels, based on an error distribution coefficient table 135. Error distribution table 135 stores a table of 3×3 error distribution matrices, with one of the error distribution matrices being selected based on the gray level value stored in gray scale image storage section 110. Error distribution unit 130 selects the appropriate error distribution matrix based on the gray level value, and distributes error from comparator 120 to adjacent pixels in gray-scale image storage section 110. The process is thereupon repeated for each x-y pixel address 105, as generated by path generator 100 which is used to generate the scanning path through image data in storage section 110, such as a serpentine scanning path, a scan-line scanning path, a blue-noise-modified scanning path, and the like.

Figure 11:
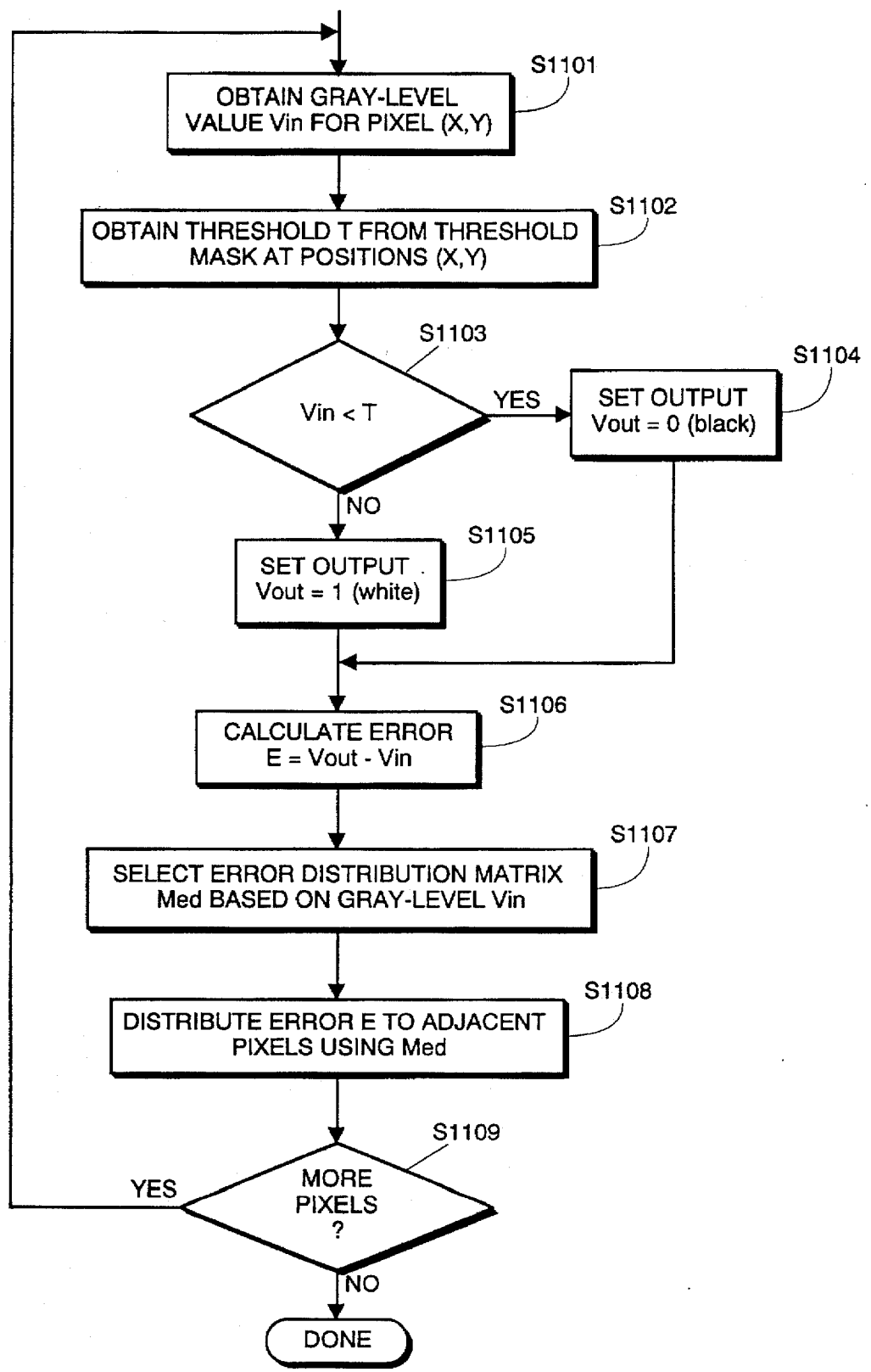
FIG. 11 is a flow diagram showing enhanced error diffusion performed by the apparatus of FIG. 10.
Figure 12:
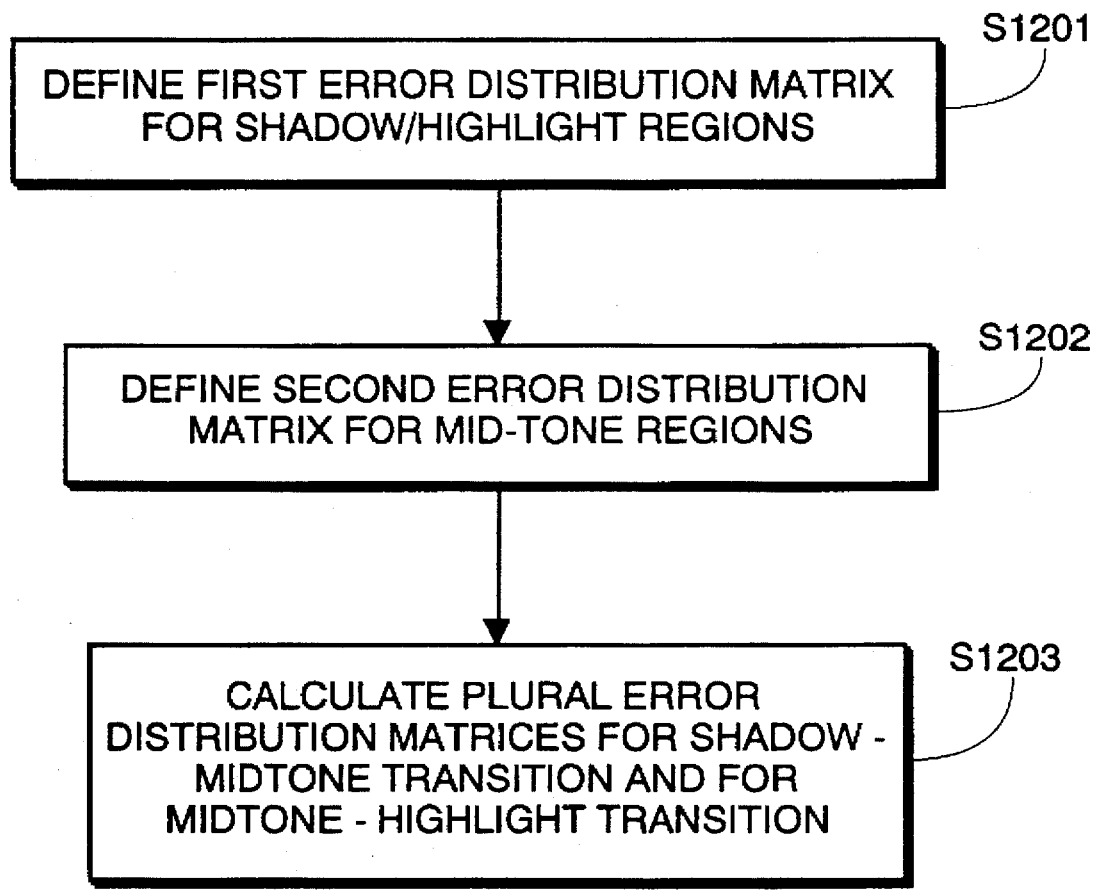
FIG. 12 is a flow diagram for explaining how to obtain error distribution matrices for use in enhanced error diffusion according to the invention.

FIG. 11 is a flow diagram showing operation of the FIG. 10 arrangement. In step S1101, and based on an x,y address generated by path generator 100, a gray-level value $V_{in}$ is obtained from gray-scale image storage section 110 at address (x,y). A threshold T is obtained from threshold mask storage section 140, also at position (x,y). In this regard, it should be understood that threshold mask storage section 140 stores a threshold mask which contains a large number of threshold values arranged in a generalized U×V matrix arrangement which preferably is square and which preferably is large (U,V≧256).

In step S1103, comparator 120 compares $V_{in}$ to T. If $V_{in}$ is smaller than T, meaning that the gray level value $V_{in}$ is darker than threshold T, comparator 120 sets the output pixel $V_{out}$ to 0 (i.e., to a black, or colored, pixel printed output). On the other hand, if $V_{in}$ is not less than T, then comparator 120 sets output $V_{out}$ equal to 1 (i.e., no colorant, or a white pixel).

In either event, flow then advances to step S1106 in which comparator 120 calculates an error E between $V_{out}$ and $V_{in}$, and sends the error E to error distribution unit 130. Based on the gray level value $V_{in}$ for the pixel under consideration, an error distribution matrix $M_{ed}$ is selected from error distribution coefficient table 135. Using the selected error distribution matrix $M_{ed}$, error distribution unit 130 distributes error E to adjacent pixels (step S1108). The distributed error is added back into appropriate gray level values for adjacent pixels, as currently stored in gray-scale image storage section 110.

In step S1109, if path generator 100 determines that more pixels still need to be processed, then flow returns to step S1101 for such processing. Otherwise, processing is completed, and binary halftone values stored in image storage section 150 are printed by output device 160.

In the present embodiment, intensities of gray-level images are assumed to be within the range of 0 and 1, where 0 represents a fully colored component (i.e., full red, green or blue) and 1 represents a completely uncolored value (i.e., white). Any linear normalization processes, well known in the art, can be applied to bring intensity values in different ranges into that assumed by the present disclosure, or those in the present disclosure can be transformed into any other range, such as 0 to 255. Furthermore, without loss of generality, it can be said that the disclosed invention is able to manipulate gray-level intensity in the range of $V_{min}$ to $V_{max}$, where $V_{min}$ and $V_{max}$ designate minimum and maximum gray level intensities.

The terms "pixel" and "individual cell" are used equally in the present disclosure in order to designate the smallest addressable entity of the image, which has an intensity attribute The output device 160 is able to interpret the set of pixels of the produced digital halftone image, whose output bi-level values stored in the output bi-level image storage unit 150 are equal to 0, as being blackened pixels, e.g. pixels, where a physical colored substrate is put on the output support. Otherwise, the pixels whose output bi-level values stored in the output bi-level image storage unit 150 are equal to 1, are not colored: they preserve the color of the output support.

[Path Generator 100]

The disclosed method is a sequential one. The order of the sequence of coordinates (x,y) of the pixels to be processed influences the quality of the produced image. This influence is well known in the art. If P(i) is the sequence of coordinates (x,y) of the pixels to be processed, the goal of the path generator unit 100 is to generate a sequence of integer pixel coordinates (x,y), $0 \leqq x \leqq W_{out}$; $0 \leqq y \leqq H_{out}$; ($W_{out}$ and $H_{out}$ are the width and the height of the output image) in such a way that all pixels are processed sequentially.

The simplest path generation scheme, the so-called scan-line path, is defined as follows:

$$P(i(x,y)) = \left( i(\text{mod } W_{out}), \text{floor}\left(\frac{i}{W_{out}}\right) \right)$$

where $W_{out}$ is the width of the output image, the operator "mod" is a modulo-division operator details, the "floor(x)" function is defined as "the biggest integer smaller or equal to x", and where successive values of integer i give the sequence of processed pixels.

There are several variants of path sequences used in the art: left-ward scan-lines instead of right-ward scan-lines; alternative left-ward and right-ward scan-lines for respectively odd and even scan-lines (serpentine or boustrophedon); upward, downward or alternative upward-downward scan-lines, etc.

The disclosed method has been implemented using boustrophedon path. Nevertheless, other path generation schemes such as scan-line may be applied.

[Error Distribution]

The comparator and error distribution unit, which comprises the comparator 120, the error distribution unit 130, the threshold mask storage 140 and the error distribution coefficient tables 135, operates on a set of intensity values of the input image $V_{in}(x,y)$ stored in the input gray-scale image storage until 110. The set of input intensity values $V_{in}(x,y)$ is compared, in the comparator 120, with the threshold value T(x,y). According to the result of this comparison, the output value $V_{out}(x,y)$ of the pixel (x,y) is set to one of two possible values:

$$V(x,y) = \left( \begin{array}{l} 1 \equiv \text{no ink; if } V_{in}(x,y) > T(x(\text{mod } xdim), y(\text{mod } ydim)) \\ 0 \equiv \text{ink; if } V_{in}(x,y) \leqq T(x(\text{mod } xdim), y(\text{mod } ydim)) \end{array} \right)$$

where (mod n) designates modulo-n arithmetic; and xdim and ydim are horizontal and vertical dimensions of the matrix T(x,y).

The threshold value T(x,y) may be constant (e.g. T(x,y) =0.5) or may depend on the input intensity level (threshold function becomes $T(x,y,V_{in}(x,y))$ in this case) or on coordinates (x,y)(threshold modulation). The disclosed method has been implemented using a perturbation well-dispersed threshold mask having a limited number of levels which is stored in the threshold mask storage 140. The output value $V_{out}(x,y)$ is carried out towards the output bi-level image storage until 150.

The difference E between the output value $V_{out}(x,y)$ and the intensity value of the input image $V_{in}(x,y)$ is re-distributed between several pixels of the weighted sum image which have not yet been processed. This re-distribution is performed by the error distribution unit 130:

$$E = V_{out}(x,y) - V_{68}(x,Y) \quad 0 \leq (u,v) < N_{ed}$$

$$V_{in}\left(x - \frac{N_{ed}-1}{2} + u, y - \frac{N_{ed}-1}{2} + v\right) =$$

$$V_{in}\left(x - \frac{N_{ed}-1}{2} + u, y - \frac{N_{ed}-1}{2} + v\right) + E \cdot M_{ed}(u,v)$$

where $N_{ed}$ is the size of the square matrix of error-distribution coefficients $M_{ed}(u,v)$ stored in the error distribution coefficient table 135.

The square matrix of error-distribution coefficients $M_{ed}(u,v)$ of odd size $M_{ed}$, stored in the error distribution tables 862, characterizes the error distribution process. For example, the size $N_{ed}$ of the square matrix of error-distribution coefficients $M_{ed}(u,v)$ may be $N_{ed}=3$. There are several matrices of error-distribution coefficients known in the art. For example, the distribution according to the well-known Floyd-Steinberg distribution scheme uses a 3×3 matrix $M_{ed}(u,v)$:

$$M_{ed}(u,v) = \frac{1}{16} \begin{vmatrix} 0 & 0 & 0 \\ 0 & 0 & 7 \\ 3 & 5 & 1 \end{vmatrix}$$

The preferred embodiment performs error distribution using a selected one of plural 3-dimensional matrix of error-distribution coefficients $M_{ed}(u,v,V_{in}(x,y))$, stored in the error distribution coefficient table 135. For any input signal intensity gray level $g=V_{in}(x,y)$, a 2-dimensional 3×3 square matrix of error-distribution coefficients $M_{ed}(u,v,g)$ is defined:

$$M_{ed}(u,v,g) = \frac{1}{S}(g) \cdot \begin{vmatrix} m_{11}(g) & m_{12}(g) & m_{13}(g) \\ m_{21}(g) & m_{22}(g) & m_{23}(g) \\ m_{31}(g) & m_{32}(g) & m_{33}(g) \end{vmatrix}$$

Only four elements of this matrix are non-zero and are effectively used in the error distribution process: the elements $m_{23}$, $m_{31}$, $m_{32}$ and $m_{33}$ when the scan-line is processed in left-to-right order, and the elements $m_{21}$, $m_{31}$, $m_{32}$ and $m_{33}$ where the scan-line is processed in right-to-left order. For the sake of simplicity, only the set of elements $\{m_{23}, m_{31}, m_{32}, m_{33}\}$ is considered. For the right-to-left pass, the elements $m_{23}$ and $m_{23}$ are interchanged, as well as the elements $m_{33}$ and $m_{31}$.

[Error Diffusion Coefficient Table]

The disclosed method uses different error-distribution coefficient matrices $M_{ed}(u,v)$ for different intensities of the input signal $g=V_{in}(x,y)$. In fact, the error distribution coefficient table 135 can be seen as a 3-dimensional table $M_{ed}(u,v,g)$.

Typically, the input signal is often represented as a set of 8-bit sampled gray-scale values. In such a case, 256 different matrices $M_{ed}(u,v)$ which correspond to 256 gray levels of the input signal are stored in the error-distribution coefficient table 135.

Figure 13:
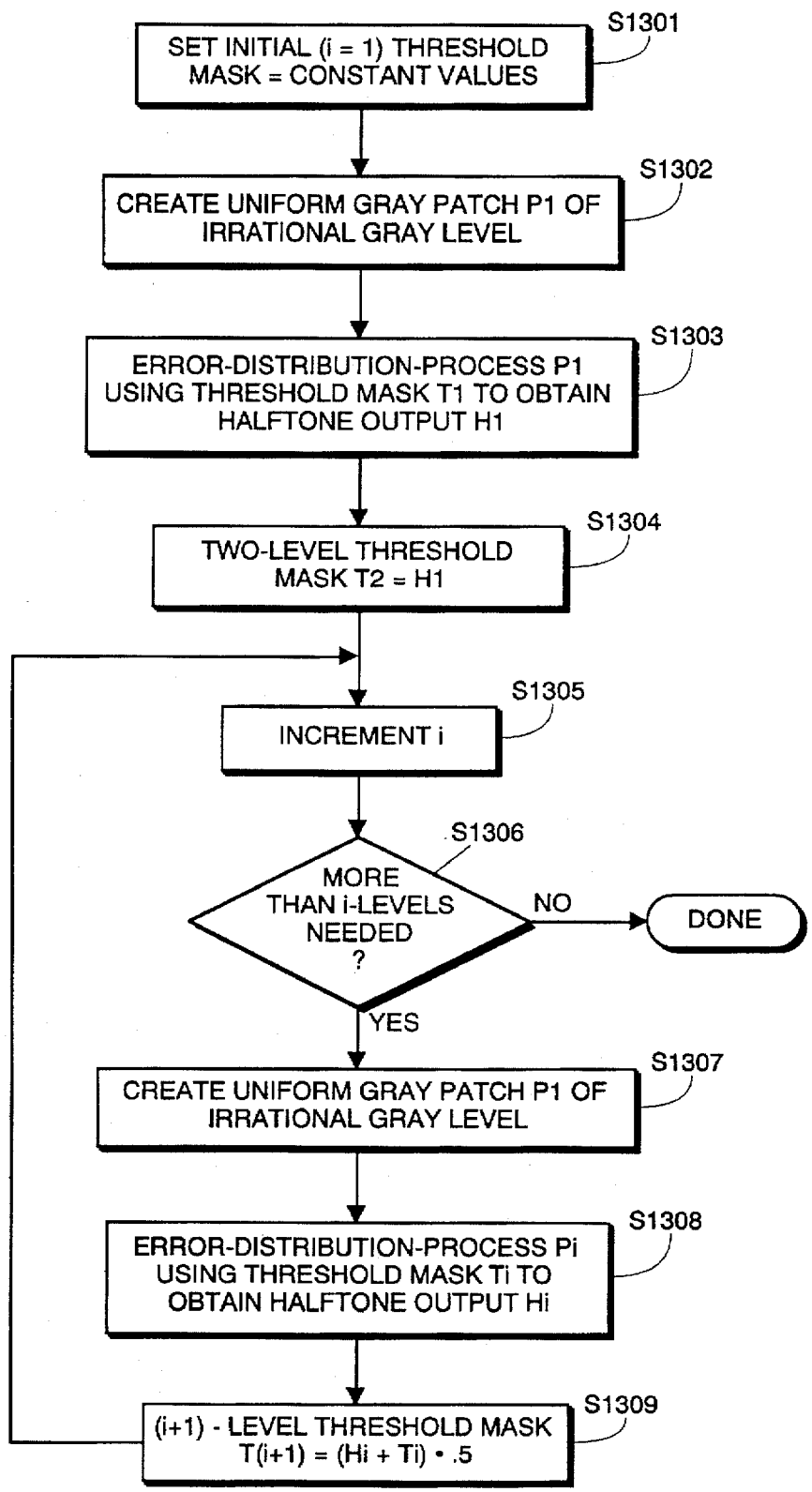
FIG. 13 is a flow diagram for explaining how to obtain threshold masks for use in enhanced error diffusion according to the invention.

This section describes the process of building the error-distribution coefficient table, as illustrated in FIG. 13. Two particular matrices $M_{ed}(u,v,g)$ are defined which have turned out to be particularly effective for error-diffusion in two ranges of values of the input signal: the matrix $M_1(u,v,g)$ in highlights and in shadows (step S1201), and the matrix $M_2(u,v,g)$ in mid-tones (step S1202):

$$M_1(u,v,g) = \frac{1}{3} \begin{vmatrix} 0 & 0 & 0 \\ 0 & 0 & 2 \\ 0 & 1 & 0 \end{vmatrix} = \frac{1}{S_1} \begin{vmatrix} 0 & 0 & 0 \\ 0 & 0 & a_{23} \\ a_{31} & a_{32} & a_{33} \end{vmatrix}$$

for highlights and shadows, i.e., where $$g \subset [0, g_1]$$

$$g \subset [g_4, 255]$$

$$M_2(u,v,g) = \frac{1}{8} \begin{vmatrix} 0 & 0 & 0 \\ 0 & 0 & 3 \\ 2 & 2 & 1 \end{vmatrix} = \frac{1}{S_2} \begin{vmatrix} 0 & 0 & 0 \\ 0 & 0 & b_{23} \\ b_{31} & b_{32} & b_{33} \end{vmatrix}$$

for mid-tones, i.e., where $$g \subset [g_2, g_3]$$

In the interval $[g_1, g_2]$ between dark grays and mid-tones, the following process which is illustrated at step S1203 ensures smooth transition between between error-distribution with the matrix $M_1(u,v,g)$ and error-distribution with the matrix $M_2(u,v,g)$:

Step A1:

for every gray-level intensity level g, calculate intermediate coefficients $im_{23}(g)$, $im_{31}(g)$, $im_{32}(g)$, $im_{33}(g)$ and is (g) according to the following formulae. The formulae apply a weighted average to the values of $M_1$ and $M_2$, with the weight depending on gray-level g:

$$im_{23}(g) = a_{23} + \frac{(g - g_1) \cdot (b_{23} - a_{23})}{(g_2 - g_1)}$$

$$im_{32}(g) = a_{32} + \frac{(g - g_1) \cdot (b_{32} - a_{32})}{(g_2 - g_1)}$$

$$im_{31}(g) = a_{31} + \frac{(g - g_1) \cdot (b_{31} - a_{31})}{(g_2 - g_1)}$$

$$im_{33}(g) = a_{33} + \frac{(g - g_1) \cdot (b_{33} - a_{33})}{(g_2 - g_1)}$$

$$is(g) = S_1 + \frac{(g - g_1) \cdot (S_2 - S_1)}{(g_2 - g_1)}$$

Step A2:

for every gray-level intensity level g, calculate the greatest common divisor $D(g)=\gcd(im_{23}(g), im_{31}(g), im_{32}(g), im_{33}(g), is(g))$.

Step A3:

for every gray-level intensity level g, calculate all elements of the matrix $M_{ed}(u,v,g)$:

$$m_{23}(g) = \frac{im_{23}(g)}{D(g)}$$

$$m_{32}(g) = \frac{im_{32}(g)}{D(g)}$$

$$S(g) = \frac{is(g)}{D(g)}$$

$$m_{31}(g) = \frac{im_{31}(g)}{D(g)}$$

$$m_{33}(g) = \frac{im_{33}(g)}{D(g)}$$

$$m_{11}(g) = m_{12}(g) = m_{13}(g) = m_{21}(g) = m_{22}(g) = 0$$

$$M_{ed}(u,v,g) = \frac{1}{S(g)} \cdot \begin{vmatrix} m_{11}(g) & m_{12}(g) & m_{13}(g) \\ m_{21}(g) & m_{22}(g) & m_{23}(g) \\ m_{31}(g) & m_{32}(g) & m_{33}(g) \end{vmatrix}$$

In the interval $[g_3, g_4]$ between highlights and mid-tones, an algorithm similar to previously disclosed one can be applied. In the particular case when the highlights, dark grays and mid-tones are defined by numbers $g_1=8, g_2=32, g_3=223$ and $g_4=247$, this algorithm produces the set of coefficients $\{m_{23}(g), m_{31}(g), m_{32}(g), m_{33}(g)\}$ shown in the Appendix.

[Well-Dispersed Threshold Mask]

The disclosed method uses a perturbation well-dispersed threshold mask having a limited number of levels which is stored in the threshold mask storage 140, in matrix form. This matrix contains set of threshold values $T(x,y)$ which may be constant (e.g. $T(x,y)=0.5$) or may depend on the input intensity level (threshold function becomes $T(x,y,V_{in}(x,y))$ in this case) or on coordinates $(x,y)$(threshold modulation). The disclosed method has been implemented using a perturbation well-dispersed threshold mask having a limited number of levels which is stored in the threshold mask storage 140. The output value $V_{out}(x,y)$ is carried out towards the output bi-level image storage unit 150.

This section describes the best expected mode for building well-dispersed threshold mask used in the disclosed enhanced error-diffusion method. This particular well-dispersed threshold mask has only three intensity levels. Without loss of generality, it can be stated that by employing very similar techniques one can obtain other masks, with limited number of intensity levels: 2-, 3-, 4-, 5- or, in general, n-level well-dispersed threshold masks, where n is a small number.

Figure 1:
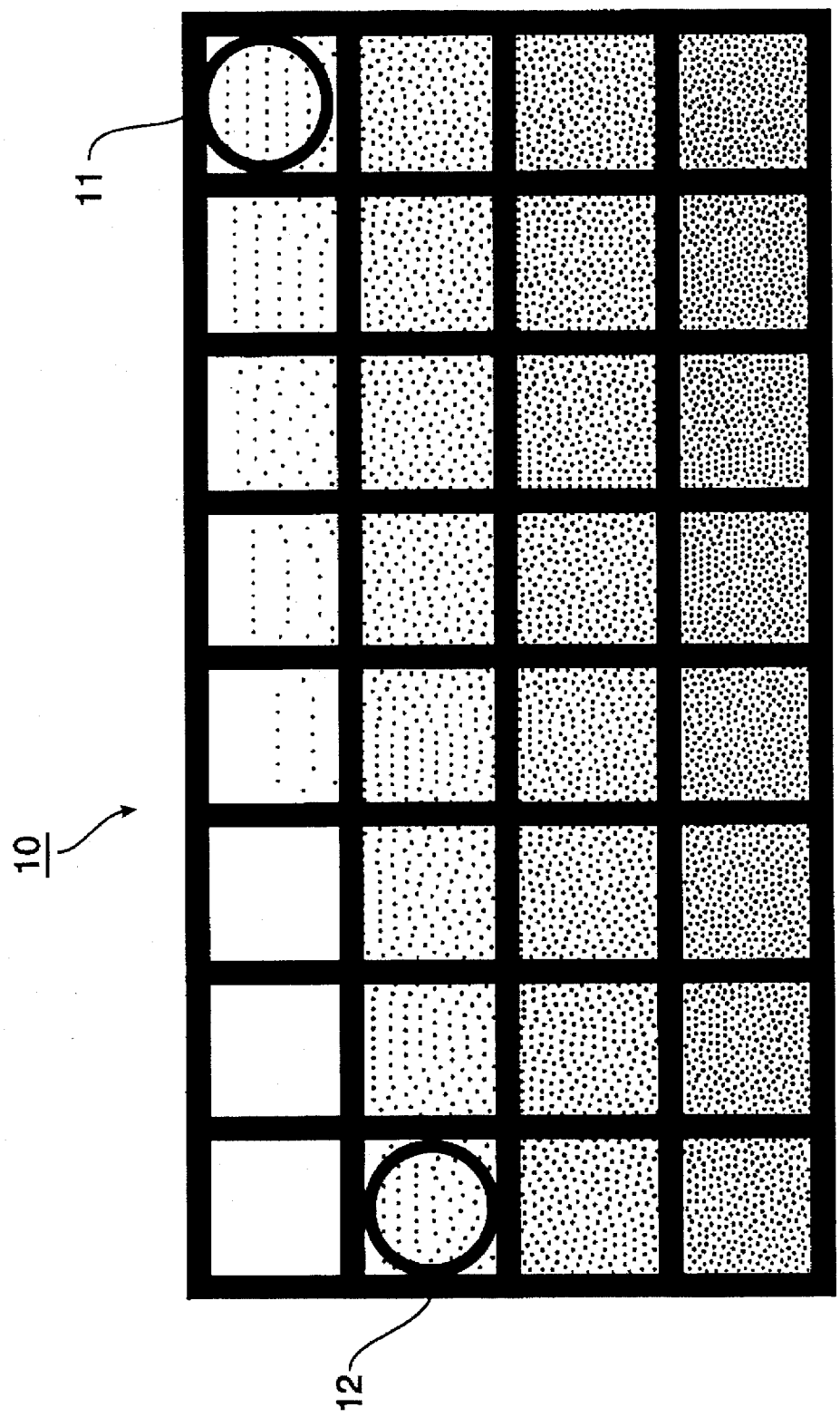
FIG. 1 is a 4×8 grid of constant gray level patches of highlights.
Figure 2:
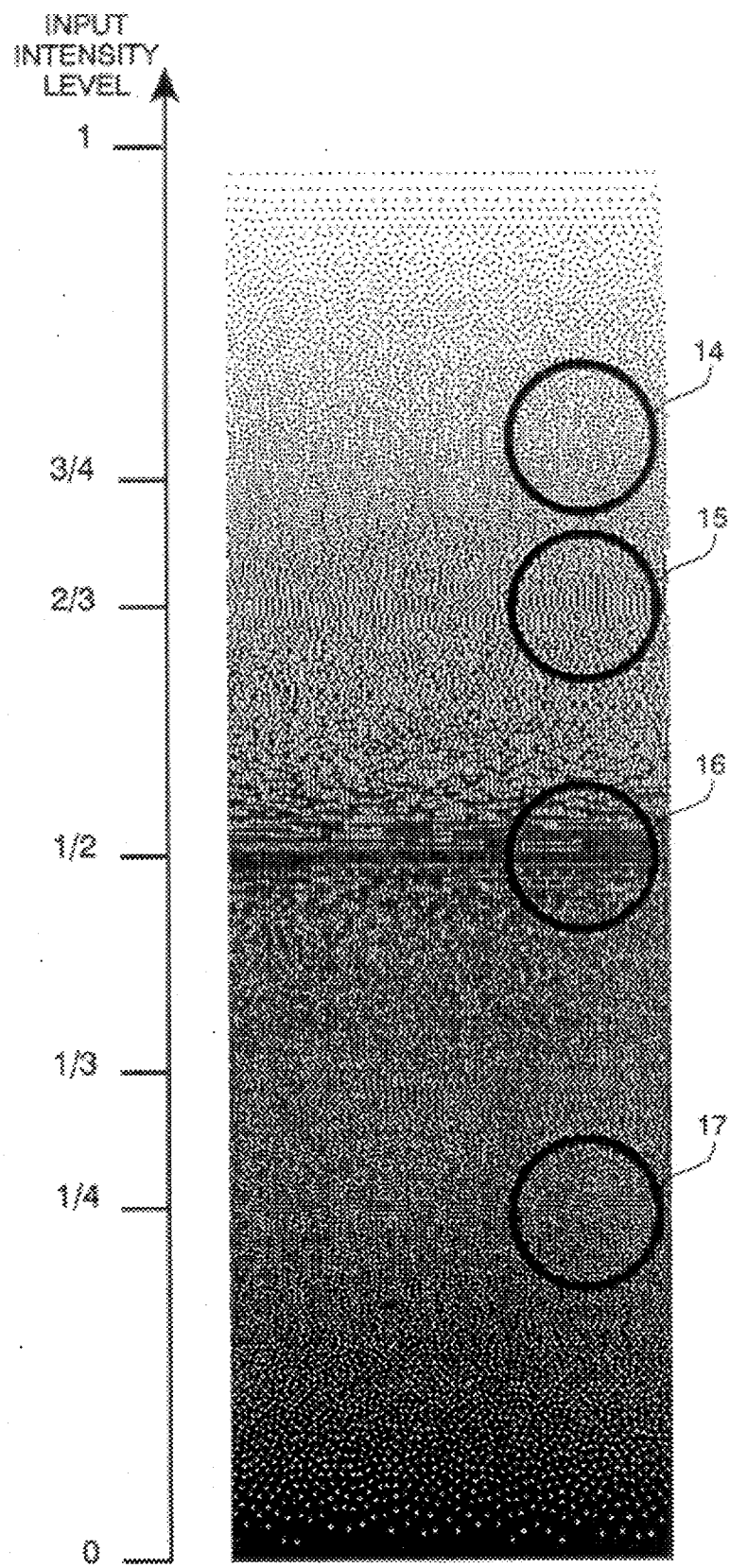
FIG. 2 is a gray level wedge produced by error diffusion techniques in the prior art showing structural artifacts.
Figure 3:
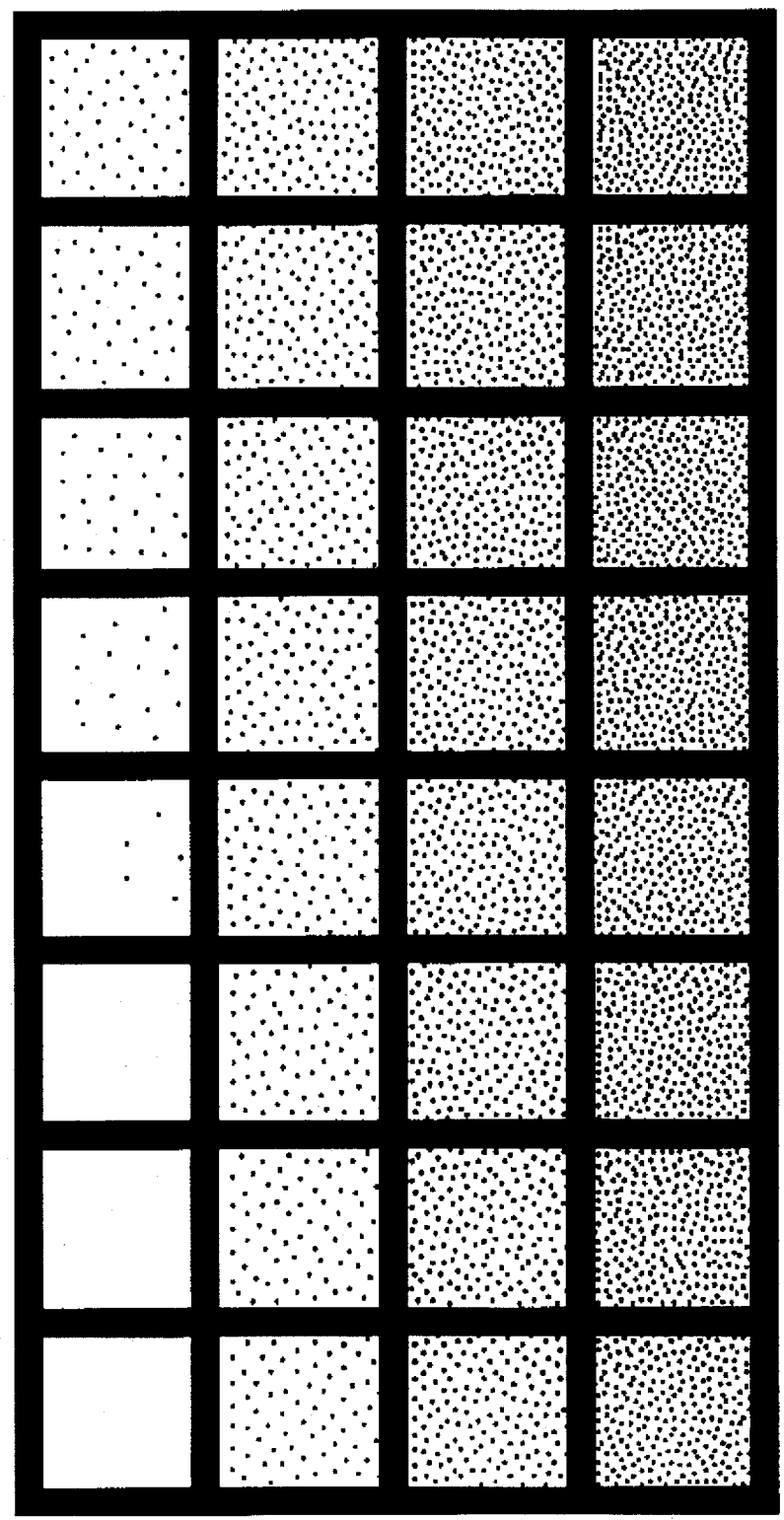
FIG. 3 is the same 4×8 grid of constant level gray patches produced by the enhanced error diffusion technique of the present invention.
Figure 4:
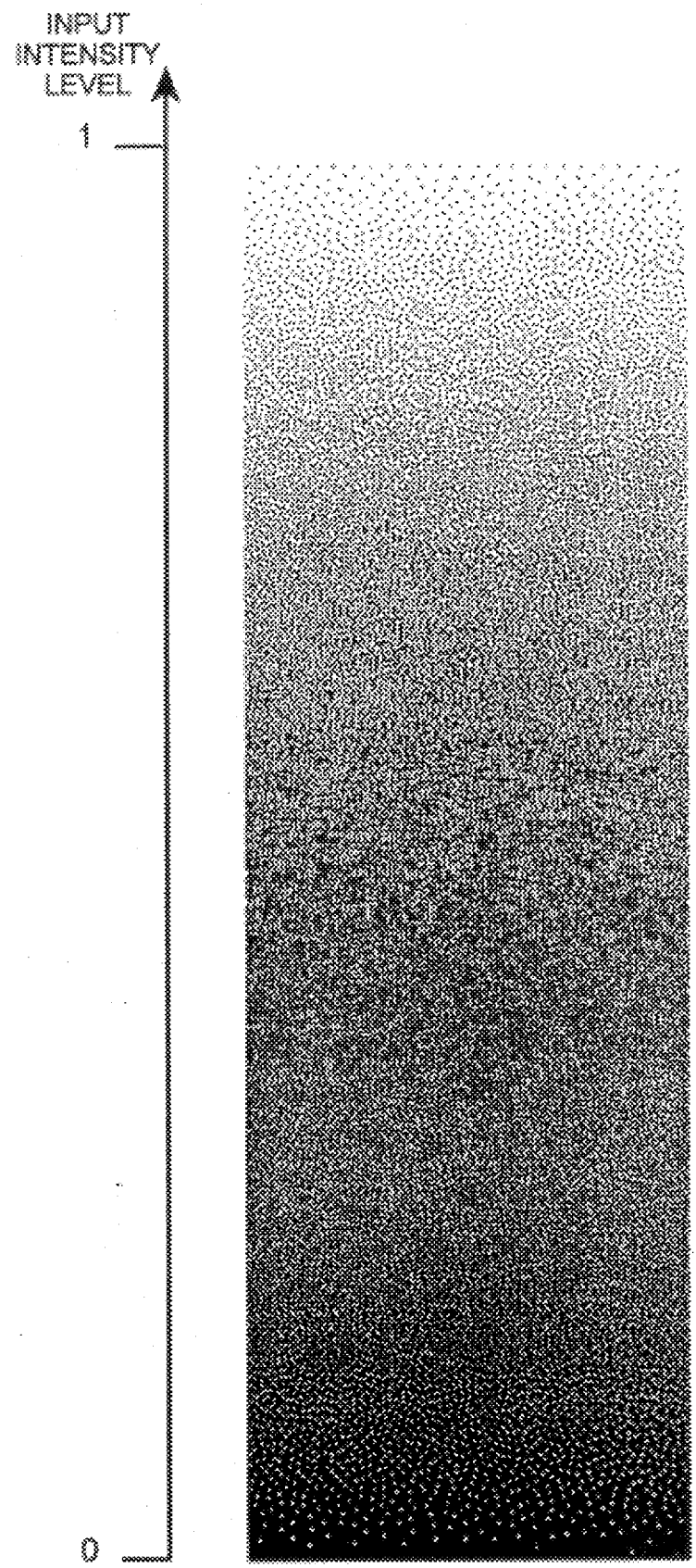
FIG. 4 is a corresponding gray level wedge produced by the enhanced error diffusion techniques of the present invention.

It has been observed that the Floyd-Steinberg error-diffusion method has its biggest structure artifacts when the intensity level of the input signal is close to small rational numbers: 1/2, 1/3, 2/3, 1/4, 3/4 etc. Structure artifact means that a set of perfectly structured patches of arbitrary shape is incorporated between randomly dispersed structures. FIG. 2 illustrates this phenomenon. Non-linear behavior of almost all printing devices, and especially strong dot gain of current ink-jet printers accentuate harmful nature of structure artifacts. Namely, the areas 15, 16 and 17 in FIG. 2 appear particularly odd when printed with real ink-jet printers.

On the other hand, it has been observed that the same Floyd-Steinberg error-diffusion method produces much more even and stable results when the intensity level of the input signal is close to irrational numbers such as $$\frac{1}{e} \approx 0.367879$$

$$\frac{1}{\pi} \approx 0.31831$$

$$\frac{1}{\phi} \approx 0.618034$$

where e is the exponential constant e (base of natural logarithms), with numerical value $2.71828\ldots$; $\pi$ is pi, with numerical value $3.14159\ldots$; $\phi$ is the golden ratio $\phi=(1+\text{Sqrt}[5])/2$, with numerical value $1.61803\ldots$.

Figure 14A:
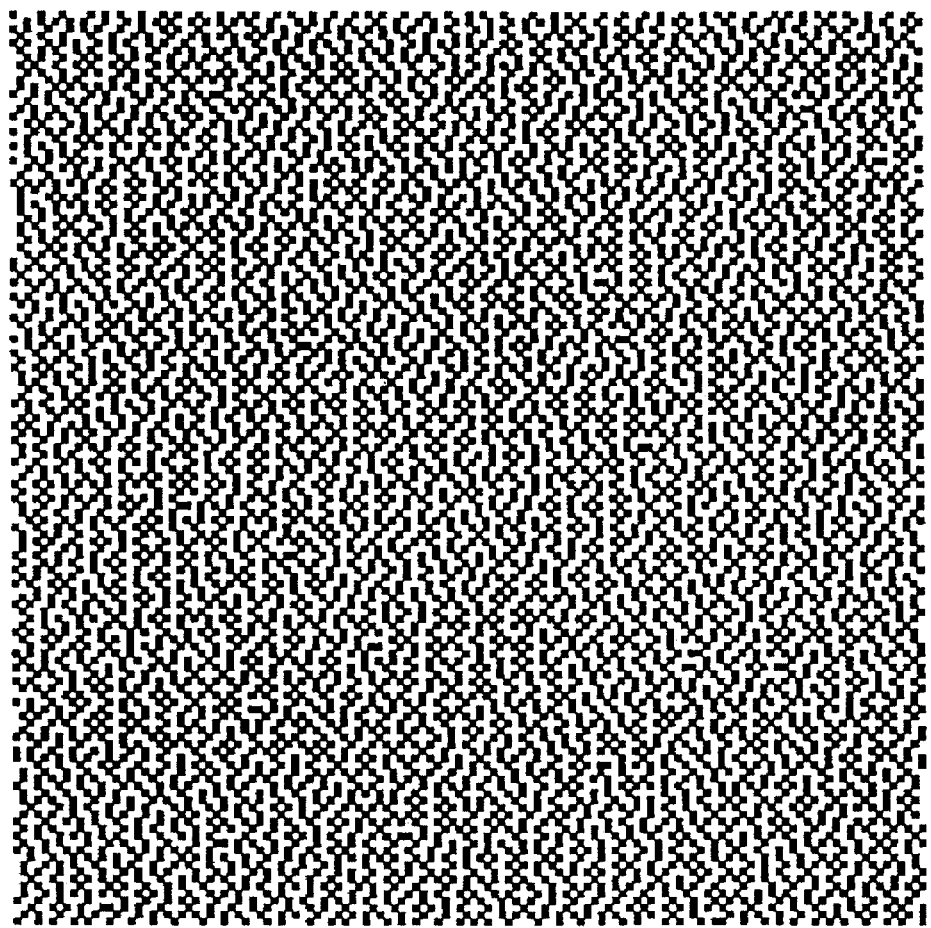
FIG. 14(a) is a view showing an intermediate output obtained during calculation of a threshold mask according to the invention.
Figure 14B:
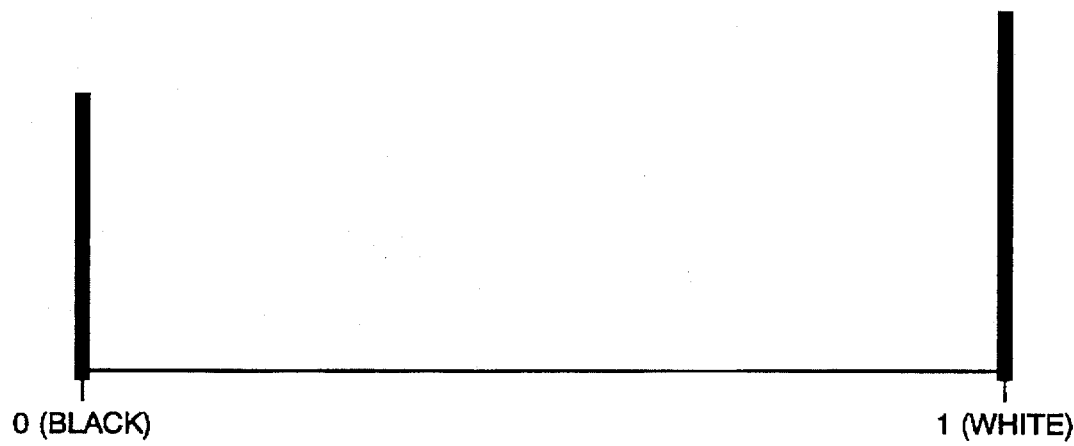
FIG. 14(b) is a histogram of the FIG. 14(a) view.

The best mode of the disclosed enhanced error-diffusion method employs an original iterative technique for building a well-dispersed multi-level threshold masks which is based on the observation mentioned above. This technique may be subdivided into several steps, which are illustrated in FIG. 13, as follows:

Step B1:

Produce a square bi-level halftone patch using any error-diffusion method (e.g. Floyd-Steinberg error-distribution scheme or an error-distribution scheme with other distribution coefficients), which corresponds to an irrational constant input intensity level. The threshold is constant and equals 0.5 in this step. FIG. 14(a) illustrates the step B1. In a preferred implementation, the input intensity level g for this first patch is chosen as $g=1/\phi=0.618034$.

Step B2:

Invert the values of the square bi-level halftone patch produced in the step B1. Inversion means that the pixels of the patch having the value of 0 receive the value of 1, and vice versa.

Figure 15A:
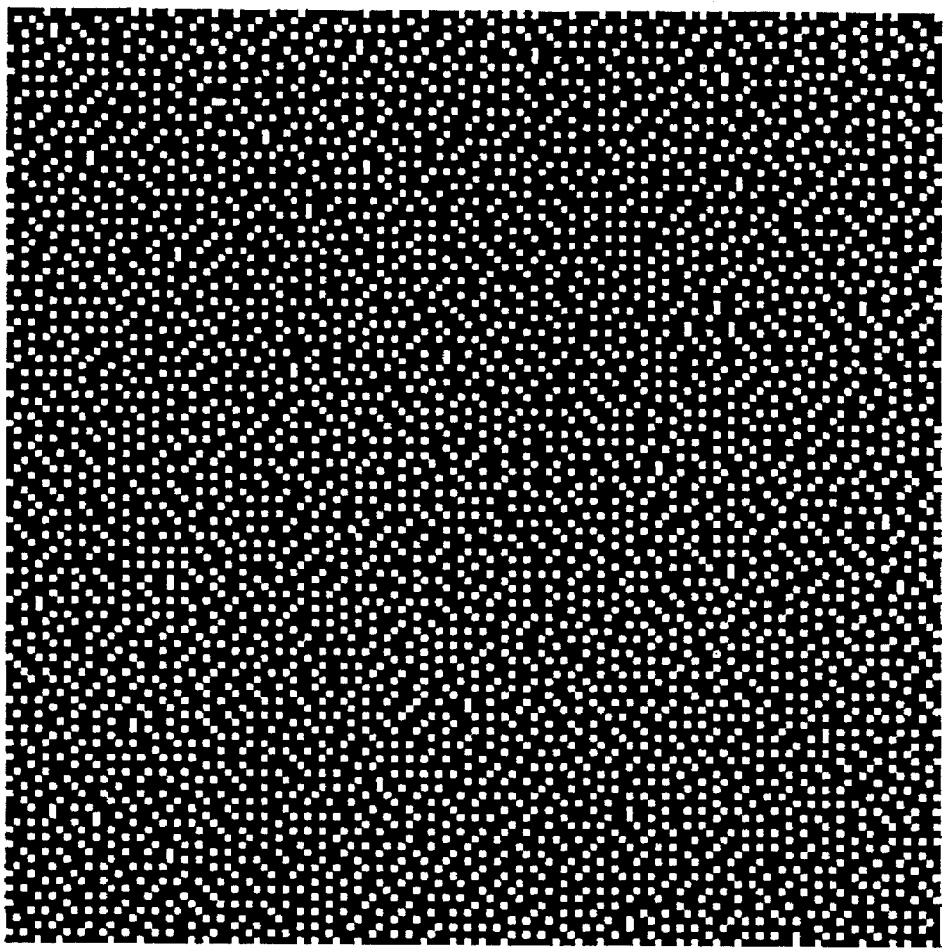
FIGS. 15(a) and 16(a) are views showing threshold masks obtained according to the invention.
Figure 15B:
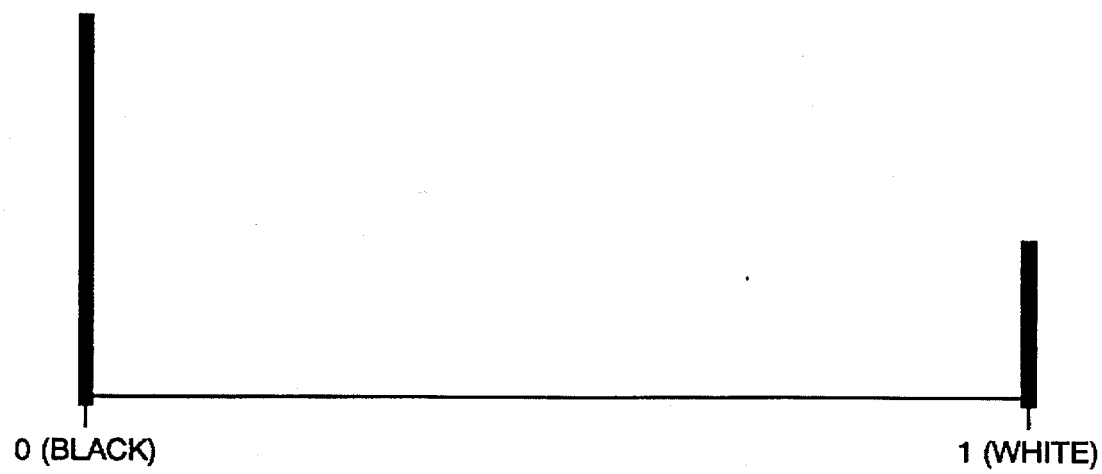
FIGS. 15(b) and 16(b) are histograms of values in FIGS. 15(a) and 16(a), respectively.

Step B3:

Produce a square bi-level halftone patch using the same error-diffusion method as that used in step B1, which corresponds to an irrational constant input intensity level. Use the square halftone patch produced in the previous steps as basic threshold mask. FIG. 15(a) illustrates the step B3. In a preferred implementation, the input intensity level g for this second patch is chosen as $g=1/\phi^3=0.236068$.

Step B4:

Invert the value of the square bi-level halftone patch produced in the step B3 and average it together with the mask produced in B2.

One pass of steps B1–B4 is sufficient for building a 3-level well-dispersed multi-level threshold mask. When the number of levels in well-dispersed multi-level threshold mask is bigger than 3, the steps B3 and B4 should be repeated iteratively.

Figure 16A:
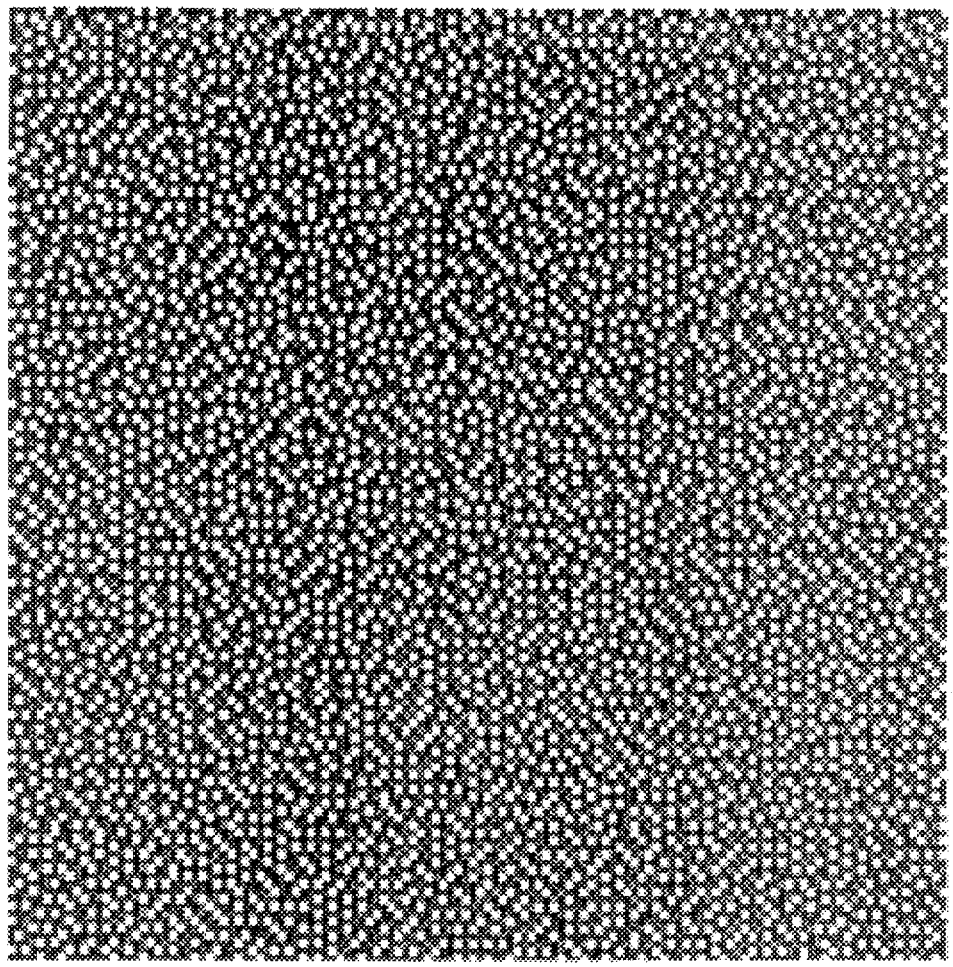
Figure 16B:
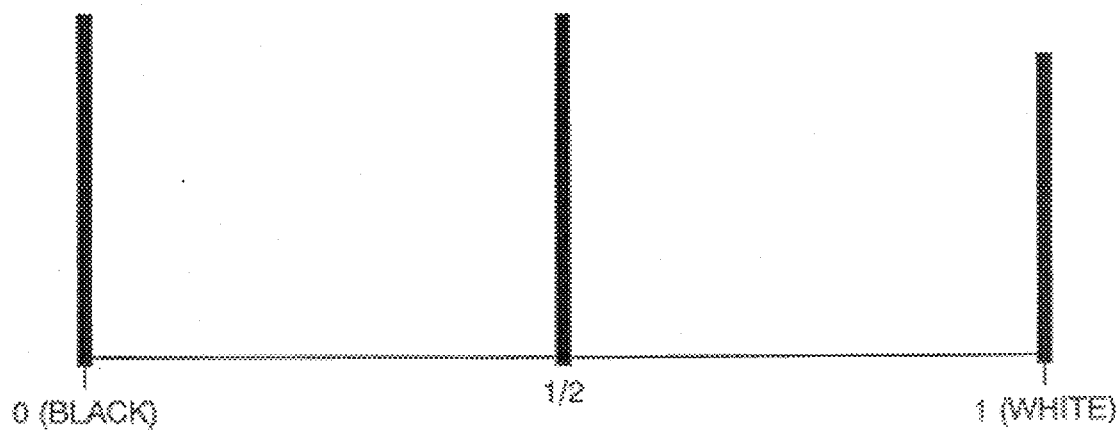

The main idea which governs the iterative technique described above is the fact that (a) the first-iteration bi-level dispersion pattern obtained in step B1 has visually pleasant dispersion structure and (b) all successive patterns obtained in steps B3–B4 are built upon the first-iteration mask. This means that, according to the above-described technique, a pseudo-random distribution obtained during the n-th step contains the distribution obtained during (n−1)-th step, as a subset. Consequently, all halftone masks are dependent, and by averaging all masks (which inherently adds all masks together), one can obtain a multi-level mask whose levels individually have very similar visual appearance and very similar well-dispersed nature. FIG. 16(a) illustrates this technique of building multi-level well-dispersed mask.

Figure 17A:
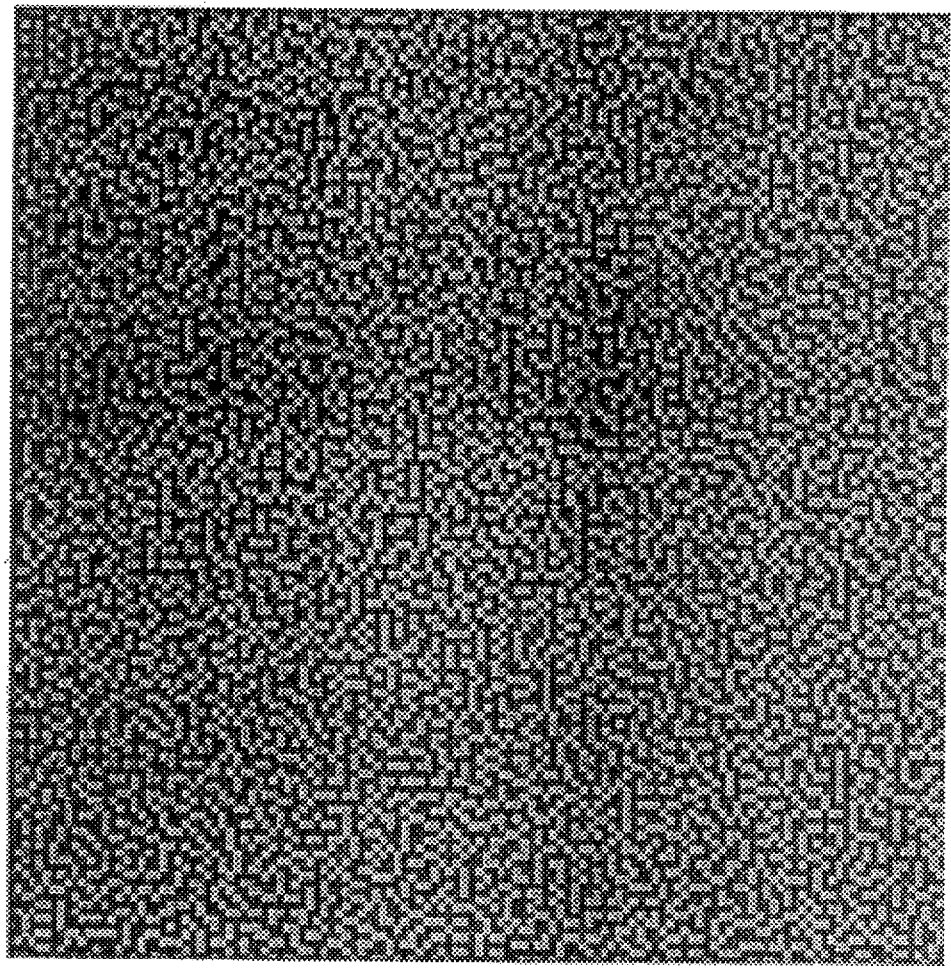
FIG. 17(a) is a view showing scaled values of a threshold mask according to the invention.
Figure 17B:
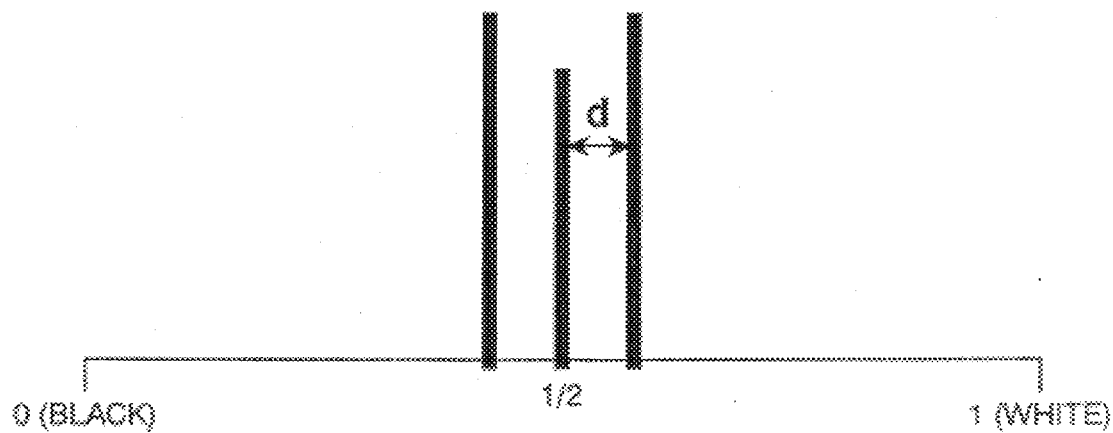
FIG. 17(b) is a histogram showing a histogram of values in FIG. 17(a).

The matrix shown in FIG. 16(a) can be rearranged in such a way that all three levels are symmetrically spaced around the intensity $g_0=0.5$, as shown in FIG. 17(a). The distance d between $g_0$ and two other intensity levels influences the force of the effect of scattering the structure effect. By increasing d, one reinforces the randomness of the halftoned output image, when the 3-level dispersed mask is used as basic threshold matrix. On the contrary, by diminishing d, one makes the halftoned output image closer to the result obtained with conventional error-diffusion, with no threshold modulation.

It is emphasized that several changes may be applied on the above-described system without departing from the teaching of the invention. It is intended that all the mater contained in the present disclosure, or shown in the accompanying drawings, shall be interpreted as illustrative rather than limiting.

[Advantages]

The invented method was conceived in order to cope with several drawbacks and imperfections of different halftoning methods known in the art, which are described in the section Description Of The Related Art.

The disclosed method improves the following aspects of the Floyd-Steinberg popular error-diffusion scheme: (1) it suppress wormy structures in highlights and dark grays, proper to Floyd-Steinberg error-diffusion; (2) it have smoother tone reproduction curve, with respect to Floyd-Steinberg's one; and (3) it diminishes considerably structure artifacts of the Floyd-Steinberg error-diffusion scheme.

The disclosed method is simple, highly understandable, and may be implemented in the printer driver in very efficient way.

The invention has been described with respect to a particular illustrative embodiment. It is to be understood that the invention is not limited to the above described embodiment and that various changes and modifications may be made by those of ordinary skill in the art without departing from the spirit and scope of the invention.

APPENDIX

| g | $m_{23}(g)$ | $m_{31}(g)$ | $m_{32}(g)$ | $m_{33}(g)$ | $S(g)$ |
|---|---|---|---|---|---|
| 0 | 2 | 0 | 1 | 0 | 3 |
| 1 | 2 | 0 | 1 | 0 | 3 |
| 2 | 2 | 0 | 1 | 0 | 3 |
| 3 | 2 | 0 | 1 | 0 | 3 |
| 4 | 2 | 0 | 1 | 0 | 3 |
| 5 | 2 | 0 | 1 | 0 | 3 |
| 6 | 2 | 0 | 1 | 0 | 3 |
| 7 | 2 | 0 | 1 | 0 | 3 |
| 8 | 2 | 0 | 1 | 0 | 3 |
| 9 | 377 | 6 | 190 | 3 | 576 |
| 10 | 185 | 6 | 94 | 3 | 288 |
| 11 | 121 | 6 | 62 | 3 | 192 |
| 12 | 89 | 6 | 46 | 3 | 144 |
| 13 | 349 | 30 | 182 | 15 | 576 |
| 14 | 19 | 2 | 10 | 1 | 32 |
| 15 | 335 | 42 | 178 | 21 | 576 |
| 16 | 41 | 6 | 22 | 3 | 72 |
| 17 | 107 | 18 | 58 | 9 | 192 |
| 18 | 157 | 30 | 86 | 15 | 288 |
| 19 | 307 | 66 | 170 | 33 | 576 |
| 20 | 25 | 6 | 14 | 3 | 48 |
| 21 | 293 | 78 | 166 | 39 | 576 |
| 22 | 143 | 42 | 82 | 21 | 288 |
| 23 | 31 | 10 | 18 | 5 | 64 |
| 24 | 17 | 6 | 10 | 3 | 36 |
| 25 | 265 | 102 | 158 | 51 | 576 |
| 26 | 251 | 114 | 154 | 57 | 576 |
| 27 | 251 | 114 | 154 | 57 | 576 |
| 28 | 61 | 30 | 38 | 15 | 144 |
| 29 | 79 | 42 | 50 | 21 | 192 |
| 30 | 115 | 66 | 74 | 33 | 288 |
| 31 | 223 | 138 | 146 | 69 | 576 |
| 32 | 3 | 2 | 2 | 1 | 8 |
| 33 | 3 | 2 | 2 | 1 | 8 |

APPENDIX-continued

| g | $m_{23}(g)$ | $m_{31}(g)$ | $m_{32}(g)$ | $m_{33}(g)$ | $S(g)$ |
|---|---|---|---|---|---|
| 34 | 3 | 2 | 2 | 1 | 8 |
| 35 | 3 | 2 | 2 | 1 | 8 |
| 36 | 3 | 2 | 2 | 1 | 8 |
| 37 | 3 | 2 | 2 | 1 | 8 |
| 38 | 3 | 2 | 2 | 1 | 8 |
| 39 | 3 | 2 | 2 | 1 | 8 |
| 40 | 3 | 2 | 2 | 1 | 8 |
| 41 | 3 | 2 | 2 | 1 | 8 |
| 42 | 3 | 2 | 2 | 1 | 8 |
| 43 | 3 | 2 | 2 | 1 | 8 |
| 44 | 3 | 2 | 2 | 1 | 8 |
| 45 | 3 | 2 | 2 | 1 | 8 |
| 46 | 3 | 2 | 2 | 1 | 8 |
| 47 | 3 | 2 | 2 | 1 | 8 |
| 48 | 3 | 2 | 2 | 1 | 8 |
| 49 | 3 | 2 | 2 | 1 | 8 |
| 50 | 3 | 2 | 2 | 1 | 8 |
| 51 | 3 | 2 | 2 | 1 | 8 |
| 52 | 3 | 2 | 2 | 1 | 8 |
| 53 | 3 | 2 | 2 | 1 | 8 |
| 54 | 3 | 2 | 2 | 1 | 8 |
| 55 | 3 | 2 | 2 | 1 | 8 |
| 56 | 3 | 2 | 2 | 1 | 8 |
| 57 | 3 | 2 | 2 | 1 | 8 |
| 58 | 3 | 2 | 2 | 1 | 8 |
| 59 | 3 | 2 | 2 | 1 | 8 |
| 60 | 3 | 2 | 2 | 1 | 8 |
| 61 | 3 | 2 | 2 | 1 | 8 |
| 62 | 3 | 2 | 2 | 1 | 8 |
| 63 | 3 | 2 | 2 | 1 | 8 |
| 64 | 3 | 2 | 2 | 1 | 8 |
| 65 | 3 | 2 | 2 | 1 | 8 |
| 66 | 3 | 2 | 2 | 1 | 8 |
| 67 | 3 | 2 | 2 | 1 | 8 |
| 68 | 3 | 2 | 2 | 1 | 8 |
| 69 | 3 | 2 | 2 | 1 | 8 |
| 70 | 3 | 2 | 2 | 1 | 8 |
| 71 | 3 | 2 | 2 | 1 | 8 |
| 72 | 3 | 2 | 2 | 1 | 8 |
| 73 | 3 | 2 | 2 | 1 | 8 |
| 74 | 3 | 2 | 2 | 1 | 8 |
| 75 | 3 | 2 | 2 | 1 | 8 |
| 76 | 3 | 2 | 2 | 1 | 8 |
| 77 | 3 | 2 | 2 | 1 | 8 |
| 78 | 3 | 2 | 2 | 1 | 8 |
| 79 | 3 | 2 | 2 | 1 | 8 |
| 80 | 3 | 2 | 2 | 1 | 8 |
| 81 | 3 | 2 | 2 | 1 | 8 |
| 82 | 3 | 2 | 2 | 1 | 8 |
| 83 | 3 | 2 | 2 | 1 | 8 |
| 84 | 3 | 2 | 2 | 1 | 8 |
| 85 | 3 | 2 | 2 | 1 | 8 |
| 86 | 3 | 2 | 2 | 1 | 8 |
| 87 | 3 | 2 | 2 | 1 | 8 |
| 88 | 3 | 2 | 2 | 1 | 8 |
| 89 | 3 | 2 | 2 | 1 | 8 |
| 90 | 3 | 2 | 2 | 1 | 8 |
| 91 | 3 | 2 | 2 | 1 | 8 |
| 92 | 3 | 2 | 2 | 1 | 8 |
| 93 | 3 | 2 | 2 | 1 | 8 |
| 94 | 3 | 2 | 2 | 1 | 8 |
| 95 | 3 | 2 | 2 | 1 | 8 |
| 96 | 3 | 2 | 2 | 1 | 8 |
| 97 | 3 | 2 | 2 | 1 | 8 |
| 98 | 3 | 2 | 2 | 1 | 8 |
| 99 | 3 | 2 | 2 | 1 | 8 |
| 100 | 3 | 2 | 2 | 1 | 8 |
| 101 | 3 | 2 | 2 | 1 | 8 |
| 102 | 3 | 2 | 2 | 1 | 8 |
| 103 | 3 | 2 | 2 | 1 | 8 |
| 104 | 3 | 2 | 2 | 1 | 8 |
| 105 | 3 | 2 | 2 | 1 | 8 |
| 106 | 3 | 2 | 2 | 1 | 8 |
| 107 | 3 | 2 | 2 | 1 | 8 |
| 108 | 3 | 2 | 2 | 1 | 8 |
| 109 | 3 | 2 | 2 | 1 | 8 |
| 110 | 3 | 2 | 2 | 1 | 8 |

APPENDIX-continued

| g | $m_{23}(g)$ | $m_{31}(g)$ | $m_{32}(g)$ | $m_{33}(g)$ | $S(g)$ |
|---|---|---|---|---|---|
| 111 | 3 | 2 | 2 | 1 | 8 |
| 112 | 3 | 2 | 2 | 1 | 8 |
| 113 | 3 | 2 | 2 | 1 | 8 |
| 114 | 3 | 2 | 2 | 1 | 8 |
| 115 | 3 | 2 | 2 | 1 | 8 |
| 116 | 3 | 2 | 2 | 1 | 8 |
| 117 | 3 | 2 | 2 | 1 | 8 |
| 118 | 3 | 2 | 2 | 1 | 8 |
| 119 | 3 | 2 | 2 | 1 | 8 |
| 120 | 3 | 2 | 2 | 1 | 8 |
| 121 | 3 | 2 | 2 | 1 | 8 |
| 122 | 3 | 2 | 2 | 1 | 8 |
| 123 | 3 | 2 | 2 | 1 | 8 |
| 124 | 3 | 2 | 2 | 1 | 8 |
| 125 | 3 | 2 | 2 | 1 | 8 |
| 126 | 3 | 2 | 2 | 1 | 8 |
| 127 | 3 | 2 | 2 | 1 | 8 |
| 128 | 3 | 2 | 2 | 1 | 8 |
| 129 | 3 | 2 | 2 | 1 | 8 |
| 130 | 3 | 2 | 2 | 1 | 8 |
| 131 | 3 | 2 | 2 | 1 | 8 |
| 132 | 3 | 2 | 2 | 1 | 8 |
| 133 | 3 | 2 | 2 | 1 | 8 |
| 134 | 3 | 2 | 2 | 1 | 8 |
| 135 | 3 | 2 | 2 | 1 | 8 |
| 136 | 3 | 2 | 2 | 1 | 8 |
| 137 | 3 | 2 | 2 | 1 | 8 |
| 138 | 3 | 2 | 2 | 1 | 8 |
| 139 | 3 | 2 | 2 | 1 | 8 |
| 140 | 3 | 2 | 2 | 1 | 8 |
| 141 | 3 | 2 | 2 | 1 | 8 |
| 142 | 3 | 2 | 2 | 1 | 8 |
| 143 | 3 | 2 | 2 | 1 | 8 |
| 144 | 3 | 2 | 2 | 1 | 8 |
| 145 | 3 | 2 | 2 | 1 | 8 |
| 146 | 3 | 2 | 2 | 1 | 8 |
| 147 | 3 | 2 | 2 | 1 | 8 |
| 148 | 3 | 2 | 2 | 1 | 8 |
| 149 | 3 | 2 | 2 | 1 | 8 |
| 150 | 3 | 2 | 2 | 1 | 8 |
| 151 | 3 | 2 | 2 | 1 | 8 |
| 152 | 3 | 2 | 2 | 1 | 8 |
| 153 | 3 | 2 | 2 | 1 | 8 |
| 154 | 3 | 2 | 2 | 1 | 8 |
| 155 | 3 | 2 | 2 | 1 | 8 |
| 156 | 3 | 2 | 2 | 1 | 8 |
| 157 | 3 | 2 | 2 | 1 | 8 |
| 158 | 3 | 2 | 2 | 1 | 8 |
| 159 | 3 | 2 | 2 | 1 | 8 |
| 160 | 3 | 2 | 2 | 1 | 8 |
| 161 | 3 | 2 | 2 | 1 | 8 |
| 162 | 3 | 2 | 2 | 1 | 8 |
| 163 | 3 | 2 | 2 | 1 | 8 |
| 164 | 3 | 2 | 2 | 1 | 8 |
| 165 | 3 | 2 | 2 | 1 | 8 |
| 166 | 3 | 2 | 2 | 1 | 8 |
| 167 | 3 | 2 | 2 | 1 | 8 |
| 168 | 3 | 2 | 2 | 1 | 8 |
| 169 | 3 | 2 | 2 | 1 | 8 |
| 170 | 3 | 2 | 2 | 1 | 8 |
| 171 | 3 | 2 | 2 | 1 | 8 |
| 172 | 3 | 2 | 2 | 1 | 8 |
| 173 | 3 | 2 | 2 | 1 | 8 |
| 174 | 3 | 2 | 2 | 1 | 8 |
| 175 | 3 | 2 | 2 | 1 | 8 |
| 176 | 3 | 2 | 2 | 1 | 8 |
| 177 | 3 | 2 | 2 | 1 | 8 |
| 178 | 3 | 2 | 2 | 1 | 8 |
| 179 | 3 | 2 | 2 | 1 | 8 |
| 180 | 3 | 2 | 2 | 1 | 8 |
| 181 | 3 | 2 | 2 | 1 | 8 |
| 182 | 3 | 2 | 2 | 1 | 8 |
| 183 | 3 | 2 | 2 | 1 | 8 |
| 184 | 3 | 2 | 2 | 1 | 8 |
| 185 | 3 | 2 | 2 | 1 | 8 |
| 186 | 3 | 2 | 2 | 1 | 8 |
| 187 | 3 | 2 | 2 | 1 | 8 |
| 188 | 3 | 2 | 2 | 1 | 8 |
| 189 | 3 | 2 | 2 | 1 | 8 |
| 190 | 3 | 2 | 2 | 1 | 8 |
| 191 | 3 | 2 | 2 | 1 | 8 |
| 192 | 3 | 2 | 2 | 1 | 8 |
| 193 | 3 | 2 | 2 | 1 | 8 |
| 194 | 3 | 2 | 2 | 1 | 8 |
| 195 | 3 | 2 | 2 | 1 | 8 |
| 196 | 3 | 2 | 2 | 1 | 8 |
| 197 | 3 | 2 | 2 | 1 | 8 |
| 198 | 3 | 2 | 2 | 1 | 8 |
| 199 | 3 | 2 | 2 | 1 | 8 |
| 200 | 3 | 2 | 2 | 1 | 8 |
| 201 | 3 | 2 | 2 | 1 | 8 |
| 202 | 3 | 2 | 2 | 1 | 8 |
| 203 | 3 | 2 | 2 | 1 | 8 |
| 204 | 3 | 2 | 2 | 1 | 8 |
| 205 | 3 | 2 | 2 | 1 | 8 |
| 206 | 3 | 2 | 2 | 1 | 8 |
| 207 | 3 | 2 | 2 | 1 | 8 |
| 208 | 3 | 2 | 2 | 1 | 8 |
| 209 | 3 | 2 | 2 | 1 | 8 |
| 210 | 3 | 2 | 2 | 1 | 8 |
| 211 | 3 | 2 | 2 | 1 | 8 |
| 212 | 3 | 2 | 2 | 1 | 8 |
| 213 | 3 | 2 | 2 | 1 | 8 |
| 214 | 3 | 2 | 2 | 1 | 8 |
| 215 | 3 | 2 | 2 | 1 | 8 |
| 216 | 3 | 2 | 2 | 1 | 8 |
| 217 | 3 | 2 | 2 | 1 | 8 |
| 218 | 3 | 2 | 2 | 1 | 8 |
| 219 | 3 | 2 | 2 | 1 | 8 |
| 220 | 3 | 2 | 2 | 1 | 8 |
| 221 | 3 | 2 | 2 | 1 | 8 |
| 222 | 3 | 2 | 2 | 1 | 8 |
| 223 | 3 | 2 | 2 | 1 | 8 |
| 224 | 223 | 138 | 146 | 69 | 576 |
| 225 | 115 | 66 | 74 | 33 | 288 |
| 226 | 79 | 42 | 50 | 21 | 192 |
| 227 | 61 | 30 | 38 | 15 | 144 |
| 228 | 251 | 114 | 154 | 57 | 576 |
| 229 | 43 | 18 | 26 | 9 | 96 |
| 230 | 265 | 102 | 158 | 51 | 576 |
| 231 | 17 | 6 | 10 | 3 | 36 |
| 232 | 31 | 10 | 18 | 5 | 64 |
| 233 | 143 | 42 | 82 | 21 | 288 |
| 234 | 293 | 78 | 166 | 39 | 576 |
| 235 | 25 | 6 | 14 | 3 | 48 |
| 236 | 307 | 66 | 170 | 33 | 156 |
| 237 | 157 | 30 | 86 | 15 | 288 |
| 238 | 107 | 18 | 58 | 9 | 192 |
| 239 | 41 | 6 | 22 | 3 | 72 |
| 240 | 335 | 42 | 178 | 21 | 576 |
| 241 | 19 | 2 | 10 | 1 | 32 |
| 242 | 349 | 30 | 182 | 15 | 576 |
| 243 | 89 | 6 | 46 | 3 | 144 |
| 244 | 121 | 6 | 62 | 3 | 192 |
| 245 | 185 | 6 | 94 | 3 | 288 |
| 246 | 377 | 6 | 190 | 3 | 576 |
| 247 | 2 | 0 | 1 | 0 | 3 |
| 248 | 2 | 0 | 1 | 0 | 3 |
| 249 | 2 | 0 | 1 | 0 | 3 |
| 250 | 2 | 0 | 1 | 0 | 3 |
| 251 | 2 | 0 | 1 | 0 | 3 |
| 252 | 2 | 0 | 1 | 0 | 3 |
| 253 | 2 | 0 | 1 | 0 | 3 |
| 254 | 2 | 0 | 1 | 0 | 3 |
| 255 | 2 | 0 | 1 | 0 | 3 |

What is claimed is:

1. A method for generating a threshold mask, the threshold mask being usable by an error diffusion halftoning process which generates halftone images by comparing gray-level pixel values against thresholds in the threshold mask, the method comprising the steps of:

defining a first gray-level patch having a constant gray level whose value is irrational;

error-diffusing the first gray level patch against a constant threshold, so as to obtain a first intermediate threshold mask;

defining a second gray-level patch having a constant gray level whose value is irrational;

error diffusing the second gray-level patch against thresholds in the first intermediate threshold mask, so as to obtain a second intermediate threshold mask; and combining the first and second intermediate threshold masks so as to generate the threshold mask.

2. A method according to claim 1, wherein in said combining step, the first and second intermediate threshold masks are combined by averaging.

3. A method according to claim 1, further comprising the steps of:

defining a third gray-level patch having a constant gray level whose value is irrational;

error diffusing the third gray-level using thresholds in the threshold mask so as to obtain a third intermediate threshold mask; and combining the threshold mask with the third intermediate threshold mask so as to obtain an updated threshold mask.

4. A method according to claim 3, further comprising repeated applications of said defining, said error-diffusing, and said combining steps, so as to obtain further updated threshold masks.

5. A method according to claim 1, wherein said first and second gray-level patches are the same.

6. A method according to claim 1, wherein said first and second gray-level patches have a common constant gray level whose value is a common irrational number.

7. A method according to claim 1, wherein said first and second gray-level patches have constant gray levels whose values are different irrational numbers.

8. A method according to claim 1, further comprising the step of scaling thresholds in the threshold mask so as to obtain a scaled threshold mask whose threshold values are weighted toward an average.

9. An error diffusion halftoning process for obtaining binary values for each pixel of a halftone image based on gray-level values of corresponding pixels in an original image, comprising the steps of:

selecting a threshold from a threshold mask based on the location of a target pixel in the original image;

comparing the gray value of the target pixel with the selected threshold value;

outputting a binary 1 or 0 for a pixel in the halftone image that corresponds to the target pixel, the binary 1 or 0 being output based on said comparing step;

determining error between the binary 1 or 0 output in said outputting step and the gray level of the target pixel; and distributing the error to pixels adjacent the target pixel;

wherein thresholds in said threshold mask are well-dispersed within the threshold mask and have a limited predetermined number of values.

10. An error diffusion halftoning process according to claim 9, wherein each thresholds in the threshold mask has have one of exactly three values.

11. An error diffusion halftoning process according to claim 10, wherein the exactly three threshold values correspond to a black threshold, a white threshold, and a mid-gray threshold.

12. An error diffusion halftoning process according to claim 9, wherein thresholds in the threshold mask are obtained by an error-diffusion process performed on a gray-level patch having a constant gray level whose value is irrational.

13. An error diffusion halftoning process according to claim 12, wherein thresholds in the threshold mask are obtained by repeated application of an error-diffusion process performed on gray-level patches having respectively constant gray levels whose values are irrational.

14. A method for building plural different sets of error distribution coefficients usable by an error diffusion halftoning process which diffuses error between binary pixel values in a halftone image and gray-level pixel values in an original image using a selected one of the plural sets of error diffusion coefficients the method comprising the steps of:

defining a first set of error diffusion coefficients usable in connection with pixels of the original image having a gray-level value corresponding to shadows or highlights;

defining a second set of error diffusion coefficients usable with pixels of the original image having a gray-level value corresponding to mid-tones; and calculating, based on values in the first and second sets of error diffusion coefficients at least one third set of error diffusion coefficients usable with pixels of the original image having a gray level value in a transition between highlights and mid-tones or a transition between mid-tones and shadows;

wherein the third set of error diffusion coefficients is calculated based on a weighted average of coefficients in the first and second sets of error diffusion coefficients, with the weighted average being calculated in accordance with coefficients in the first set of error diffusion coefficients and in accordance with a difference between coefficients in the first and second sets of error diffusion coefficients.

15. A method according to claim 14, wherein plural sets of error diffusion coefficients are built such that there is exactly one set of error diffusion coefficients for each gray level value.

16. A method according to claim 15, further comprising a step of storing the plural sets of error diffusion coefficients into a look-up table in memory so that each set of error diffusion coefficients is addressable in accordance with its corresponding gray level.

17. An error diffusion halftoning process for obtaining binary values for each pixel of a halftone image based on gray-level values of corresponding pixels in an original image, comprising the steps of:

selecting a threshold from a threshold mask based on the location of a target pixel in the original image;

comparing the gray value of the target pixel with the selected threshold value;

outputting a binary 1 or 0 for a pixel in the halftone image that corresponds to the target pixel, the binary 1 or 0 being output based on said comparing step;

determining error between the binary 1 or 0 output in said outputting step and the gray level of the target pixel; and distributing the error to pixels adjacent the target pixel;

wherein said step of distributing error further comprises the step of selecting a set of error distribution coefficients from plural such sets of error distribution coefficients, the selected set of error distribution coefficients being selected based on gray level of the target pixel, and wherein thresholds in said threshold mask are well-dispersed within the threshold mask and have a limited predetermined number of values.

18. A process according to claim 17, wherein said plural sets of error distribution coefficients include at least a first set of error distribution coefficients for use with gray levels corresponding to highlights/shadows, a second set of error distribution coefficients for use with gray level pixels having a mid-tone value, and a third set of error distribution coefficients for transition pixels between highlights and mid-tones and for transition regions between mid-tones and shadows.

19. A process according to claim 18, wherein the third set of error distribution coefficients are formed by a weighted average of coefficients in the first and second sets of error distribution coefficients, the weighted average being calculated based on coefficients in the first set of error diffusion coefficients and in accordance with a difference between coefficients in the first and second sets of error diffusion coefficients.

20. A process according to claim 19, wherein said plural sets of error distribution coefficients include exactly one set of error distribution coefficients for each gray level.

21. A process according to claim 20, further comprising a step of storing the plural sets of error diffusion coefficients into a look-up table in memory so that each set of error diffusion coefficients is addressable in accordance with its corresponding gray level.

22. A method for distributing error in an error diffusion halftoning process which generates binary pixel values for a halftone image from gray-level pixel values of an original image by comparing gray value of a target pixel in the original image with a threshold value, setting a corresponding pixel in the halftone image to a binary 0 or 1 based on the comparison, and distributing error between the binary value and the gray level value to pixels adjacent the target pixel, said error diffusion method comprising the steps of:

determining the gray value of the target pixel;

selecting a first error distribution matrix in a case where the gray value corresponds to a shadow region or a highlight region, the first error distribution matrix being:

$$\frac{1}{3} \begin{vmatrix} 0 & 0 & 0 \\ 0 & 0 & 2 \\ 0 & 1 & 0 \end{vmatrix};$$

and selecting a second error distribution matrix, different from the first matrix, in a case where the gray value corresponds to a mid-tone region.

23. A method according to claim 22, wherein the second error distribution matrix is:

$$\frac{1}{8} \begin{vmatrix} 0 & 0 & 0 \\ 0 & 0 & 3 \\ 2 & 2 & 1 \end{vmatrix}.$$

24. A method according to claim 22, wherein the second error distribution matrix is:

$$\frac{1}{16} \begin{vmatrix} 0 & 0 & 0 \\ 0 & 0 & 7 \\ 3 & 5 & 1 \end{vmatrix}.$$

25. A method according to claim 22, further comprising the step of selecting a third error distribution matrix in a case where the gray value is in a transition region between highlights and mid-tones or in a transition region between mid-tones and shadow.

26. A method according to claim 25, wherein the third error distribution matrix is a weighted average between the first and second error distribution matrix, weight of the weighted average being calculated in accordance with gray level for the third error diffusion matrix and in accordance with a difference between gray levels for the first and second error diffusion matrices.

* * * * *

UNITED STATES PATENT AND TRADEMARK OFFICE
CERTIFICATE OF CORRECTION

PATENT NO. : 5,737,453

DATED : April 7, 1998

INVENTOR(S) : Victor Ostromoukhov

Page 1 of 2

It is certified that error appears in the above-identified patent and that said Letters Patent is hereby corrected as shown below:

Column 1, line 21, change "has" to --has a--.

Column 4, line 39, change "mean" to --means--.

Column 9, line 5, change "R.G" to --R, G,--.

Column 10, line 9, change "BMP" to --.BMP--.

Column 12, line 7, change "attribute" to --attribute.--.

Column 13, line 14, change "$V_{68}(x, Y) 0 \leq (u,v) < N_{ed}$" to --$V_\epsilon(x,Y) \quad 0 \leq (u,v) < N_{ed}$--;
line 26, change "$M_{ed}$," to --$N_{ed}$,--; and
line 60, change "$m_{23}$ are" to --$m_{21}$ are--.

Column 14, line 37, change "between between" to --between--.

Column 16, line 38, change "as" to --as the--.

UNITED STATES PATENT AND TRADEMARK OFFICE
CERTIFICATE OF CORRECTION

PATENT NO. : 5,737,453

DATED : April 7, 1998

INVENTOR(S) : Victor Ostromoukhov

It is certified that error appears in the above-identified patent and that said Letters Patent is hereby corrected as shown below:

Column 17, line 21, suppress" to --suppresses--; and
                line 22, change "have" to --has--.

Claim 10, column 21, line 62, change "thresholds" to --threshold--.

Claim 14, column 22, line 16, change "coefficients" to --coefficients,--; and
                column 22, line 25, change "coefficients" to --coefficients,--; and
                column 23, line 33, change "gray" to --the gray--.

Signed and Sealed this

Seventeenth Day of November, 1998

BRUCE LEHMAN

*Attest:*

*Attesting Officer*      *Commissioner of Patents and Trademarks*